US009601295B2

(12) United States Patent
DeBoer et al.

(10) Patent No.: US 9,601,295 B2

(45) Date of Patent: Mar. 21, 2017

(54) BREAKER TRIPPING MECHANISMS, CIRCUIT BREAKERS, SYSTEMS, AND METHODS OF USING SAME

(71) Applicant: Siemens Industry, Inc., Alpharetta, GA (US)

(72) Inventors: John DeBoer, Denver, CO (US); Brian Timothy McCoy, Lawrenceville, GA (US); Guang Yang, Suwanee, GA (US); John Quentin Cowans, Decatur, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 14/797,920

(22) Filed: Jul. 13, 2015

(65) Prior Publication Data

US 2015/0318136 A1 Nov. 5, 2015

Related U.S. Application Data

(62) Division of application No. 12/728,839, filed on Mar. 22, 2010, now Pat. No. 9,349,559.

(Continued)

(51) Int. Cl.

| | |
|---|---|
| ***H01H 71/24*** | (2006.01) |
| ***H01H 71/40*** | (2006.01) |
| ***H01H 71/02*** | (2006.01) |
| ***H02B 1/04*** | (2006.01) |
| ***H01H 71/16*** | (2006.01) |
| ***H01H 71/32*** | (2006.01) |

(Continued)

(52) U.S. Cl.

CPC ........ *H01H 71/2436* (2013.01); *H01H 71/02* (2013.01); *H01H 71/0271* (2013.01); *H01H 71/1045* (2013.01); *H01H 71/12* (2013.01); *H01H 71/164* (2013.01); *H01H 71/325* (2013.01); *H01H 71/405* (2013.01); *H01H 2071/168* (2013.01); *H01H 2205/002* (2013.01); *Y10T 29/49105* (2015.01)

(58) Field of Classification Search

CPC ........... H01H 71/0271; H01H 71/1045; H01H 71/12; H01H 71/2436; H01H 71/02; H01H 71/405; H01H 2205/002; H01H 71/164; H01H 71/325; H01H 2071/168; Y10T 29/49105

USPC ............ 337/3, 13, 54, 90, 98, 102, 107, 112

See application file for complete search history.

(56) References Cited

U.S. PATENT DOCUMENTS 2,810,048 A 10/1957 Christensen 2,813,167 A * 11/1957 Bingenheimer ..... H01H 71/405 335/145

(Continued)

FOREIGN PATENT DOCUMENTS

EP 1939912 A1 7/2008

*Primary Examiner* — Anatoly Vortman

(57) ABSTRACT

Embodiments provide tripping unit of a circuit breaker. The tripping unit includes a magnet, a bimetal member extending alongside of the magnet, and an armature pivotable on the magnet, wherein the armature having an engagement portion engageable with the bimetal member at a moveable end of the bimetal member. Circuit breakers including triggering mechanisms and tripping units are also disclosed, as are low-profile, electronic circuit breakers including a maximum transverse width (Wt) limited to occupy only a single standard breaker panelboard location. System and methods are provided, as are other aspects.

7 Claims, 19 Drawing Sheets

Related U.S. Application Data

(60) Provisional application No. 61/302,283, filed on Feb. 8, 2010, provisional application No. 61/162,731, filed on Mar. 24, 2009, provisional application No. 61/162,417, filed on Mar. 23, 2009.

(51) Int. Cl.
*H01H 71/10* (2006.01)
*H01H 71/12* (2006.01)

(56) References Cited

U.S. PATENT DOCUMENTS 2,922,004 A * 1/1960 Miller .................... H01H 71/08 200/250
3,109,907 A 11/1963 Dessert et al.
3,116,388 A * 12/1963 Hobson, Jr. ............ H01H 83/20 335/173
3,134,051 A * 5/1964 Lyon ...................... H01H 9/342 200/293
3,171,931 A 3/1965 Powell
3,200,228 A 8/1965 Locher
3,213,241 A * 10/1965 Gelzheiser ............. H01H 71/06 200/308
3,795,841 A 3/1974 Klein
3,812,400 A 5/1974 Gryctko et al.
3,908,154 A 9/1975 Gryctko
3,950,715 A * 4/1976 Bagalini .............. H01H 71/405 335/35
3,970,975 A 7/1976 Gryctko
3,999,103 A 12/1976 Misencik et al.
4,178,572 A 12/1979 Gaskill et al.
4,232,282 A * 11/1980 Menocal ............ H01H 71/0214 335/202
4,479,101 A * 10/1984 Checinski ............ H01H 71/405 335/174
4,536,823 A 8/1985 Ingram et al.
4,568,899 A 2/1986 May et al.
4,616,199 A * 10/1986 Oster ................... H01H 71/121 335/21
4,616,200 A 10/1986 Fixemer et al.
4,630,019 A * 12/1986 Maier ................ H01H 71/7436 335/45
4,641,217 A 2/1987 Morris et al.
4,929,919 A 5/1990 Link et al.
4,933,653 A * 6/1990 Mrenna .................. H01H 71/34 335/174
5,001,315 A 3/1991 Runyan et al.
5,245,302 A * 9/1993 Brune .................. H01H 71/405 335/23
5,260,676 A 11/1993 Patel et al.
5,293,522 A 3/1994 Fello et al.
5,301,083 A 4/1994 Grass et al.
5,381,120 A * 1/1995 Arnold ............... H01H 71/7463 335/35
5,453,723 A 9/1995 Fello et al.
5,481,235 A 1/1996 Heise et al.
5,483,211 A 1/1996 Carrodus et al.
5,483,212 A 1/1996 Lankuttis et al.
5,510,759 A 4/1996 Gula et al.
5,694,101 A 12/1997 Lavelle et al.
5,831,509 A * 11/1998 Elms .................... H01H 71/125 335/35
5,859,578 A * 1/1999 Arnold ................. H01H 71/121 337/110
5,870,008 A * 2/1999 Pannenborg ......... H01H 71/405 335/172
5,889,643 A 3/1999 Elms
6,052,046 A 4/2000 Ennis et al.
6,239,676 B1 5/2001 Maloney et al.
6,239,962 B1 5/2001 Seymour et al.
6,255,925 B1 7/2001 DiMarco et al.
6,278,605 B1 8/2001 Hill
6,420,948 B1 7/2002 Runyan
6,487,057 B1 11/2002 Natili
6,545,574 B1 4/2003 Seymour et al.
6,633,211 B1 * 10/2003 Zindler .............. H01H 71/7463 335/35
6,724,591 B2 4/2004 Clarey et al.
7,250,836 B2 * 7/2007 Fleege ................... H01H 71/08 335/202
7,488,913 B1 2/2009 Durham et al.
7,518,482 B2 * 4/2009 Fleege ................... H01H 71/16 337/36
7,994,882 B2 8/2011 Zende et al.
9,349,559 B2 * 5/2016 DeBoer .............. H01H 71/0271
2002/0105770 A1 8/2002 Seese
2003/0063420 A1 4/2003 Pahl et al.
2004/0070483 A1 * 4/2004 Richter ................ H01H 71/164 337/23
2005/0195055 A1 9/2005 McCoy
2006/0028307 A1 2/2006 McCoy et al.
2008/0094155 A1 * 4/2008 Fleege ............... H01H 71/7418 335/6
2008/0135391 A1 6/2008 McCoy
2008/0158788 A1 7/2008 Darr
2009/0200271 A1 8/2009 Chen et al.
2009/0205941 A1 8/2009 Watford
2010/0020453 A1 1/2010 McCoy

* cited by examiner

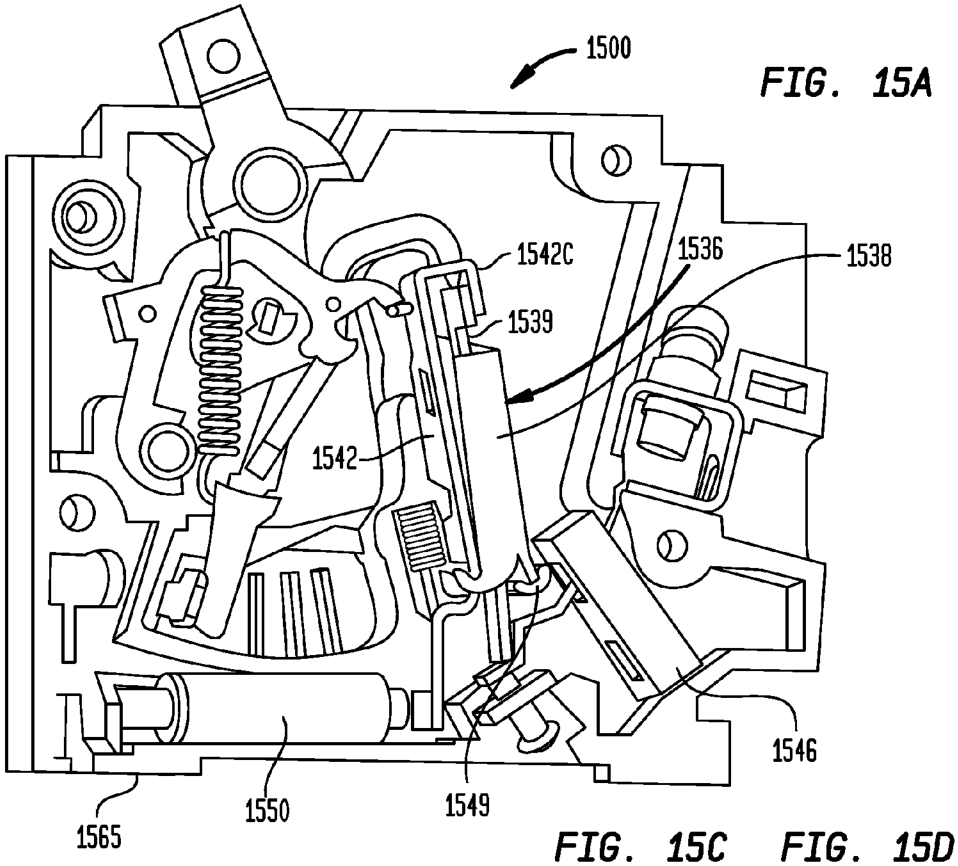
FIG. 15A
FIG. 15B
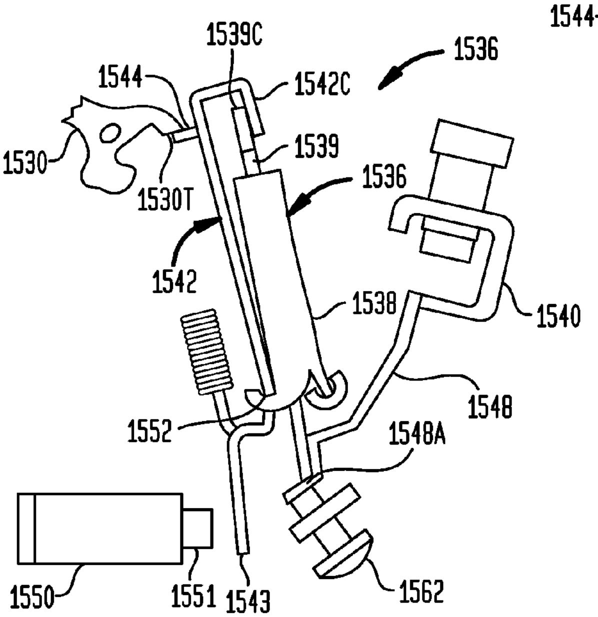
FIG. 15C
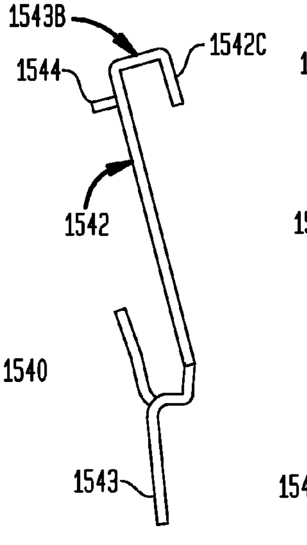
FIG. 15D
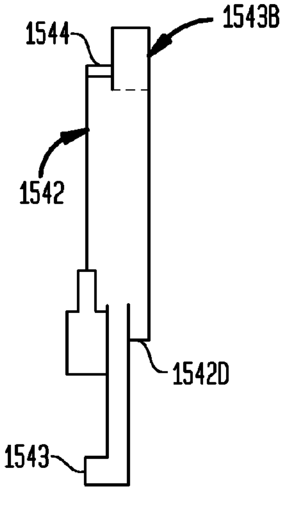

BREAKER TRIPPING MECHANISMS, CIRCUIT BREAKERS, SYSTEMS, AND METHODS OF USING SAME

RELATED APPLICATIONS

The present application is a divisional of, and claims priority to U.S. application Ser. No. 12/728,839 entitled "LOW-PROFILE ELECTRONIC CIRCUIT BREAKERS, BREAKER TRIPPING MECHANISMS, AND SYSTEMS AND METHODS OF USING SAME" filed on Mar. 22, 2010, which claimed priority to U.S. Provisional Application Ser. No. 61/302,283 entitled "CIRCUIT BREAKER WITH ENHANCED INTERRUPTION CAPABILITY" filed on Feb. 8, 2010, U.S. Provisional Application Ser. No. 61/162,731 entitled "ELECTRONIC CIRCUIT BREAKER WITH TWIN OR DUPLEX MECHANICAL POLES" filed on Mar. 24, 2009, and U.S. Provisional Application Ser. No. 61/162,417 entitled "CIRCUIT BREAKER ARC CHAMBER DESIGN THAT FACILITATES INTERRUPTIONS" filed on Mar. 23, 2009, the disclosures of which are hereby incorporated by reference in their entirety herein.

FIELD

The present invention relates generally to circuit breakers for interrupting current from an electrical power supply, and more particularly to electronic circuit breakers including two internal electrical branches and tripping mechanisms for circuit breakers.

BACKGROUND

Electronic circuit breakers are used in certain electrical systems for protecting an electrical circuit (hereinafter "protected circuit") coupled to an electrical power supply. For example, one type of electrical circuit breaker is a ground fault circuit interrupter (GFCI). GFCIs are utilized in electrical systems to prevent electrical shock hazards, and are typically included in electrical circuits adjacent to water, such as in residential bathrooms or kitchens. Another type of electronic circuit breaker is an arc fault circuit interrupter (AFCI). AFCIs interrupt power to an electrical circuit when an arcing situation is detected within the circuit. GFCIs and AFCIs may also provide persistent over current and short circuit protection, and provide for hand circuit breaker tripping as well. GFCI's and AFCI's are within the class of "electronic circuit breakers" and include an internal printed circuit board, which together with one or more onboard sensors may detect changes in an electrical condition within the protected circuit and trip a tripping mechanism of the electronic circuit breaker.

Because such GFCIs and AFCIs include numerous electronic components such as printed circuit boards, sensors, and electromagnets, as well as mechanical components such as contact arms, electrical contacts, cradles, springs, armatures, magnets and bimetal elements to accomplish the tripping function, and terminals, lugs, lug screws and internal wiring for connection to the protected circuit and circuit breaker panelboard, packaging of such electronic circuit breakers within a small space envelope has not been possible, particularly in the case of duplex electronic circuit breakers. Accordingly, in the case of conventional duplex electronic circuit breakers, which include two internal electrical branches, such breakers have been configured to take up two standard circuit breaker locations within the panelboard. As such, conventional duplex electronic circuit breakers to date have exhibited either an overall width of 1½ inches thereby occupying two ¾-inch standard panelboard spaces, or an overall width of 2 inches, thereby occupying two 1-inch standard panelboard spaces.

Accordingly, there is a long-felt and unmet need for an electronic circuit breaker having two electrical branches which exhibits a lower profile (i.e., a lower overall transverse width).

SUMMARY

In a first aspect, an electronic circuit breaker including two electrical branches is provided. The electronic circuit breaker includes a housing containing a first branch and a second branch and, the housing having a maximum transverse width (Wt); a first load terminal coupled to the first branch; a second load terminal coupled to the second branch; and an electronic processing circuit within the housing adapted to monitor an electrical condition of one or more of the first branch and the second branch, wherein the maximum transverse width (Wt) of the housing is limited so as to occupy only a single standard breaker panelboard location.

In another aspect, an electrical panelboard system is provided. The electrical panelboard system includes a panelboard including a plurality of standard circuit breaker mounting locations; and an electronic circuit breaker including a first branch and a second branch, the electronic circuit breaker occupying a single standard mounting location on the panelboard.

According to another aspect, a method of installing an electronic circuit breaker is provided. The method includes providing a panelboard including a plurality of standard circuit breaker mounting locations; and mounting an electronic circuit breaker including a first branch and a second branch on the panelboard such that the electronic circuit breaker occupies a single standard circuit breaker mounting location on the panelboard.

In yet another aspect, a circuit breaker is provided. The circuit breaker includes a housing containing a moveable electrical contact; and a tripping mechanism coupled to a moveable electrical contact, the tripping mechanism including a tripping unit having a magnet, a bimetal member extending alongside of the magnet, and an armature pivotable on the magnet, the armature having an engagement portion engageable with the bimetal member at a moveable end of the bimetal member.

In another aspect, a tripping unit of a circuit breaker is provided. The tripping unit includes a magnet; a bimetal member extending alongside of the magnet; and an armature pivotable on the magnet, the armature having an engagement portion engageable with the bimetal member at a moveable end of the bimetal member.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the invention.

BRIEF DESCRIPTION OF DRAWINGS

FIG. 15A is a side view of another tripping assembly in a circuit breaker according to embodiments of the invention.

FIG. 15B is a side view of a tripping unit of the tripping assembly of FIG. 15A.

FIG. 15C is a side view of an armature of the tripping unit of FIG. 15B.

FIG. 15D is a front view of the armature of FIG. 15C.

DETAILED DESCRIPTION

Figure 1:
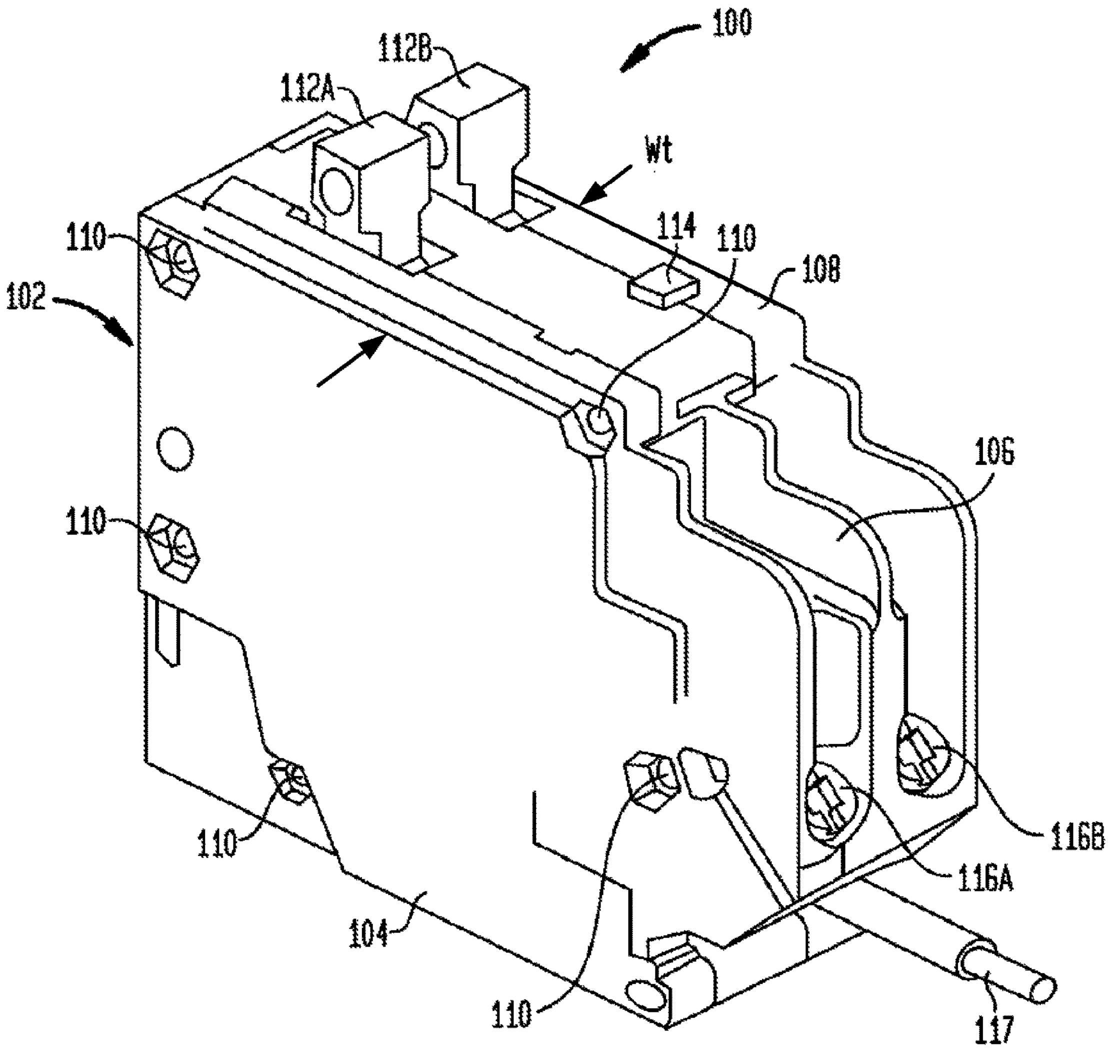
FIG. 1 is a perspective view of a low-profile electronic circuit breaker including two branches according to embodiments of the present invention.

In view of the foregoing difficulties, and, in particular, the large profile exhibited by conventional electronic circuit breakers having a first and second electrical branch therein, there is a need for an electronic circuit breaker of this type, which exhibits a substantially lower profile width. In particular, there is a need for an electronic circuit breaker having a first and second electrical branch therein, which may be accommodated within a single standard breaker mounting location on a circuit breaker panelboard. Accordingly, the present invention provides a low-profile, electronic circuit breaker including a first and second branch, wherein the electronic circuit breaker may fit with a space envelope, which was formally occupied by a conventional single-pole electronic circuit breaker. The present invention is described with reference examples of electronic circuit breakers including a first and second branch and which have a 1-inch transverse overall width. However, the invention is equally applicable to electronic circuit breakers having a ¾-inch overall transverse width.

Advantageously, the present invention enables the ability to service, and interrupt, a greater number of protected circuits, and up to twice as many protected circuits, within a fixed space of any particular-sized circuit breaker panelboard. For example, in a standard circuit breaker panelboard having 12 standard one-inch circuit breaker locations, greater than 12 circuits, and up to 24 circuits, may be protected by using the electronic circuit breaker according to a first aspect of the invention.

In another broad aspect, a circuit breaker including an improved tripping mechanism is provided. The circuit breaker includes a housing containing a moveable electrical contact; and a tripping mechanism coupled to the moveable electrical contact, wherein the tripping mechanism includes a magnet, a bimetal member extending alongside of the magnet, and an armature which is pivotable on the magnet, wherein the armature has an engagement portion engageable with the bimetal member. A tripping unit having a low-profile construction is also provided. In some embodiments, the armature has a first end and a second end and an armature pivot located between the first end and second end. An actuator may be coupled to the armature at the first end, and the cradle may be coupled to the armature at the second end. This structure enables the actuator to be non-centrally mounted within an electronic circuit breaker thereby allotting internal space for other electronic breaker components, and resultantly lowering a profile width thereof.

The present invention is not limited to the illustrative examples for a duplex electronic circuit breaker including two electrical branches provided herein, and may be employed with other types of electronic circuit breakers including two branches. For example, this low-profile aspect of present invention may be useful with two-pole electronic circuit breakers, surge protective devices such as transient voltage surge protection (TVSS) devices, metering circuit breakers, electronic trip unit breakers, and remotely controllable circuit breakers, for example. Other types of breakers including two branches may benefit as well. Furthermore, the tripping mechanisms and tripping units described herein may be used in electronic circuit breakers, but may be used also with non-electronic electronic circuit breakers, as well as in circuit breakers including any number of poles or branches.

These and other embodiments of electronic circuit breakers including two branches, systems including one or more such electronic circuit breakers, improved tripping mechanisms and tripping units and methods of the present invention are described below with reference to FIGS. 1-17B. The drawings are not necessarily drawn to scale.

Referring now in specific detail to FIG. 1, a duplex electronic circuit breaker 100 is shown. The duplex circuit breaker 100 will be referred to herein as a "duplex electronic circuit breaker" or just an "electronic circuit breaker." The duplex electronic circuit breaker 100 includes a breaker housing 102, which may be formed from several housing portions. According to some embodiments, the housing 102 may include three housing portions. In the depicted embodiment, left housing portion 104, center housing portion 106, and right housing portion 108 may interconnect with each other via multiple rivets 110 to form the housing 102 and internal spaces and surfaces to contain, mount and retain the other circuit breaker components, which will be further described herein. The housing portions 104, 106, 108 may be made from any suitable rigid plastic, such as thermoset plastic material (e.g., polyester) available from Bulk Molding Compounds, Inc. of Chicago, Ill. Other materials may be used. Furthermore, other means of fastening the portions together may be used, such as screws, plastic welding, or adhesive. Furthermore, a higher number of housing portions may be used to form the breaker housing 102.

The duplex electronic circuit breaker 100 may include a plurality of handles 112A, 112B, one for each electrical branch. The handles 112A, 112B may be used to manually switch the electronic circuit breaker 100. As illustrated, each respective branch of the duplex electronic circuit breaker 100 may be individually switched or tripped. Further, the electronic circuit breaker 100 may include one or more load neutral terminals. In the depicted embodiment, two load neutral terminals 116A, 116B are employed; one associated with each electrical branch. The duplex electronic circuit breaker 100 may include neutral line pigtail 117 adapted to be secured to a panelboard (described later herein). The electronic circuit breaker 100 may also include a test button 114. Although not shown, the two handles 112A, 112B may be tied together with a crossbar or other tying member, such that the switching of one branch switches both branches, for example.

As discussed above the duplex electronic circuit breaker 100 including two electrical branches may include a low profile wherein a transverse width (Wt) may be less than about 1 inch (less than about 25.4 mm). In this manner, the electronic circuit breaker 100 of the invention may be received and installed within a width of a single standard circuit breaker mounting location in a panelboard.

Figure 2:
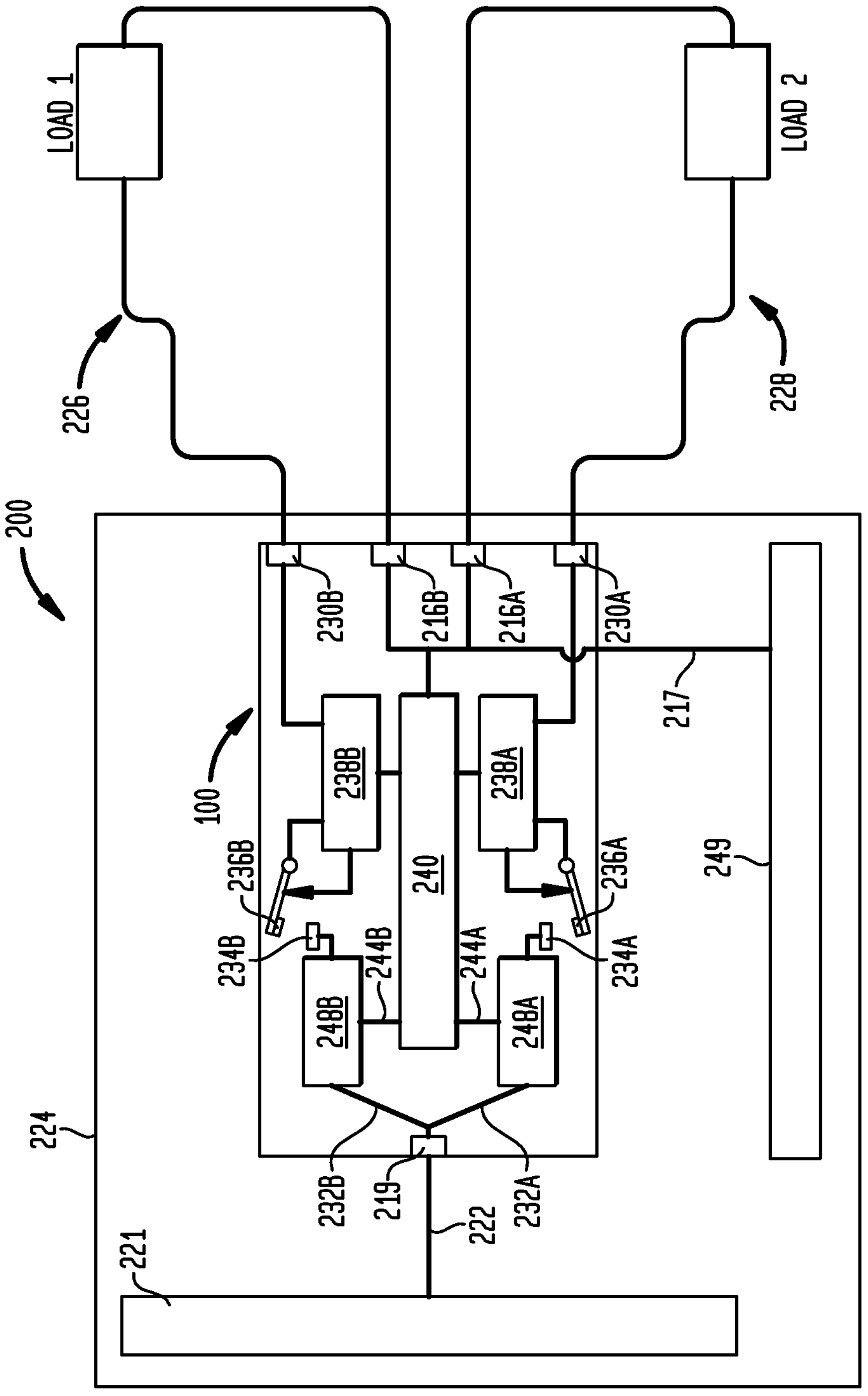
FIG. 2 is a block diagram of an electrical system including an electronic circuit breaker according to embodiments of the present invention.

Referring now to FIG. 2, an illustrative block diagram of an electrical system 200 including a duplex electronic circuit breaker 100 in accordance with embodiments of the present invention is shown. The electronic circuit breaker 100 may include a power terminal 219, and in the depicted embodiment, may consist of a single power terminal 219 on a line side of the electronic circuit breaker 100. The power terminal 219 may be connectable to a bus 221 (e.g., a single-phase bus) through an electrical conduction path 222. The electrical conduction path 222 may be formed in a circuit breaker panelboard 224 onto which the electronic circuit breaker 100 is received and mounted, for example. The power terminal 219 may have a U-shaped form (See terminal 314 in FIG. 3) and may be adapted to be coupled to a stab (FIG. 11A) provided at a single standard circuit breaker location in the circuit breaker panelboard 224. Optionally, a standard assembly including a lug and lug screw may be employed. The term "panelboard" as used herein refers to any component that includes the ability to distribute electrical power to multiple electrical circuits, and which is adapted to receive and mount one or more circuit breakers to protect those electrical circuits. A panelboard including an electronic circuit breaker 100 of the invention is shown and described with reference to FIGS. 11A and 11B herein.

Again referring to FIG. 2, two separate electrical circuits 226, 228 including electrical loads (Load 1 and Load 2) may be connected to the electronic circuit breaker 100 at a first load terminal 230A and a second load terminal 230B, one for each electrical branch. Load 1 and Load 2 may be resistive, inductive, capacitive, or any combination thereof. The load terminals 230A, 230B may be integral with the electronic circuit breaker 100 and may be made of conventional construction. The protected electrical circuits 226, 228 may also connect to one or more load neutral terminals. In the depicted embodiment, a first load neutral terminal 216A, second load neutral terminal 216B, and neutral line pigtail 217, may be provided on the electronic circuit breaker 100. However, it should be understood that a single load neutral terminal may be used and each load neutral connection may be received and secured thereat.

In more detail, within the duplex electronic circuit breaker 100, a current (e.g., single-phase current) from the power terminal 219 may be split into two electrical branches 232A, 232B. Optionally, there may be two load terminals, one for each branch. Each of these electrical branches 232A, 232B includes their own pair of electrical contacts 234A, 234B, 236A, 236B wherein at least one electrical contact of each set is a moveable electrical contact (e.g., electrical contacts 236A, 236B). Each branch 232A, 232B may also include its own tripping mechanisms 238A, 238B including mechanical, electromechanical and material components to accomplish circuit breaker tripping, i.e., separation of the respective electrical contacts 234A, 236A and 234B, 236B from one another under various circuit conditions.

For example, the tripping mechanisms 238A, 238B may each include a cradle, spring, armature, actuator, magnet and bimetal element, as will be described herein. Each electrical branch 232A, 232B may include one of the load terminals 230A, 230B. An electronic processing circuit 240, which may be a printed circuit board, is provided in the electronic circuit breaker 100. The electronic processing circuit 240 may be electrically coupled to one or more sensors 248A, 248B. Each branch may include a sensor (e.g., 248A, 248B). The sensors 248A, 248B may sense an electrical condition in one or more of the branches 232A, 232B (e.g., an electrical current therein) and provide a signal indicative of the electrical condition of the branch 232A, 232B, and thus of the electrical circuits 226, 228, to the electronic processing circuit 240 in lines 244A, 244B.

The electronic processing circuit 240 may process the indicative signal from the sensors 248A, 248B for one or more of the branches 232A, 232B. In particular, the electronic processing circuit 240 may execute an algorithm to determine whether an unwanted electrical condition exists in one or both of the electrical circuits 226, 228. For example, the electronic processing circuit 240 may process the input from the sensors 248A, 248B according to known algorithms to determine whether an unwanted electrical condition exists in one or both of the circuits 226, 228, such as an arc fault, a ground fault, or other unwanted condition, for example. In some embodiments, the electronic processing circuit 240 may simply monitor the circuit condition. The particular algorithms for determining the existence of an unwanted electrical condition, and the electronic circuit components of the electronic processing circuit 240 will not be further described herein, as they are well known in the art.

Upon a determination that an unwanted electrical condition exists in one or both of the electrical circuits 226, 228, the electronic processing circuit 240 may cause one or both of the tripping mechanisms 238A, 238B, to trip one or more of the moveable electrical contacts 236A, 236B as indicated by the arrow shown extending to the contact arm of the moveable electrical contacts 236A, 236B. This action causes the electrical current in the affected electrical branch 232A, 232B of the electronic circuit breaker 100 to be interrupted upon separation of the moveable electrical contact 236A from the stationary contact 234A, and/or the separation of the moveable electrical contact 236B from the stationary electrical contact 234B, depending on whether one or both electrical branches 232A, 232B are tripped.

The tripping mechanisms 238A, 238B may further each include a bimetal member in the current path of each branch 232A, 232B, which may detect an over current condition in the protected circuit 226, 228 and also trip the electronic circuit breaker 100 upon exceeding a pre-designed and pre-set threshold temperature. Furthermore, the tripping mechanisms 238A, 238B may trip the electronic circuit breaker 100 upon detecting a short circuit, as will be described further below. The neutral line pigtail 217 may be connected internally to the load neutral terminals 216A, 216B and to the electronic processing circuit 240. The neutral line pigtail 217 may also be connected to a panel neutral 249 of the circuit breaker panelboard 224. Further details of a first branch of the electronic circuit breaker 100 according to embodiments of the invention will now be described with reference to FIG. 3. It should be recognized that the present invention requires two electrical branches. Both may be electronic or one may be electronic and the other one mechanical.

Figure 3:
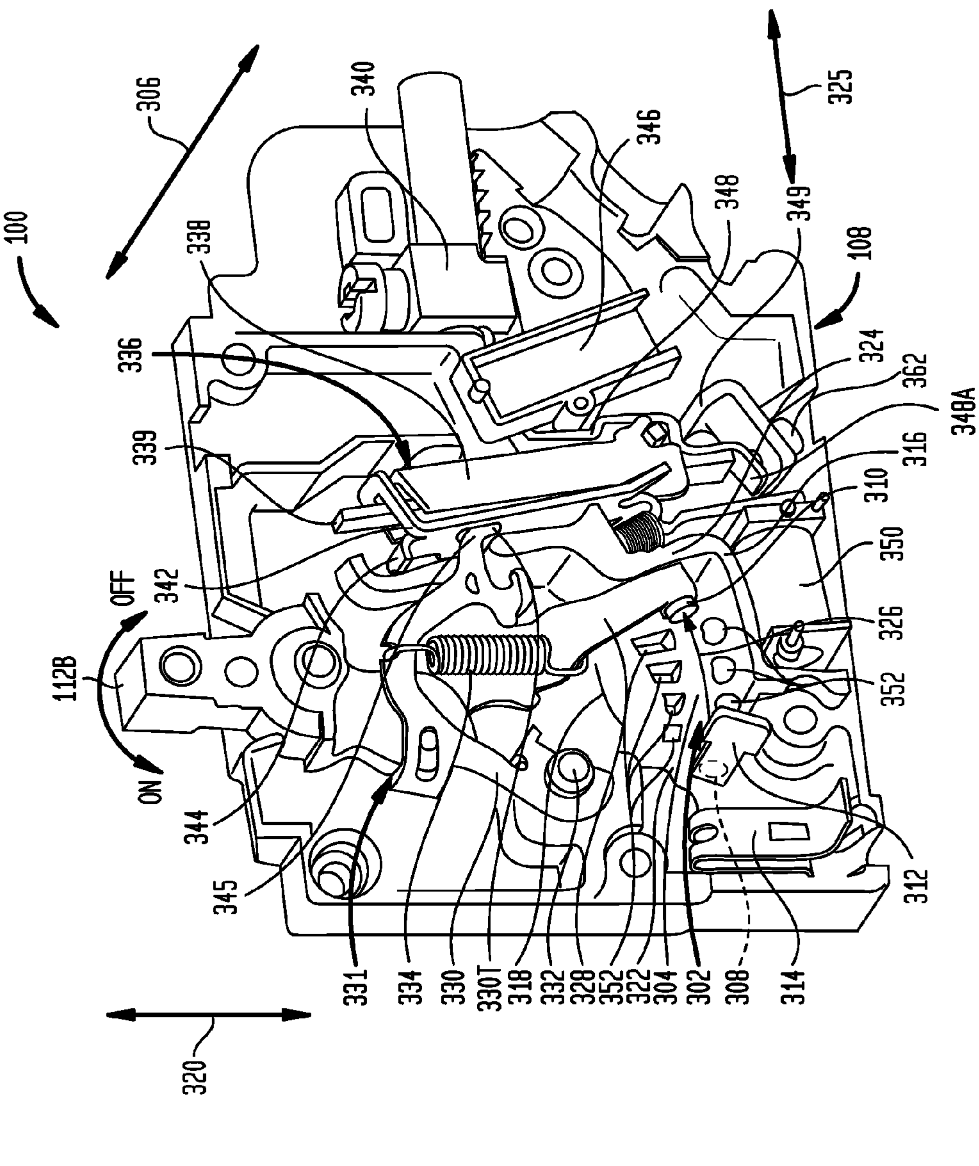
FIG. 3 is a perspective view illustrating a portion of the components of a first branch of an electronic circuit breaker according to embodiments of the invention.

FIG. 3 illustrates an embodiment of a first branch of the duplex electronic circuit breaker 100 of FIG. 1. In the depicted embodiment, the right housing portion 108 of the circuit breaker 100 is shown. The right housing portion 108 interfaces with the center housing portion 106 (FIG. 1) to form an arc chamber 302 which receives and extinguishes the arc created during a circuit breaker interruption event. A first transverse sidewall 304 of the arc chamber 302 is formed by an inside surface of the housing portion 108. The opposing transverse sidewall of the arc chamber 302 is formed by the center portion 106 of the housing (See FIG. 1 and FIG. 8) that interfaces with the housing portion 108. The arc chamber 302 extends between the first transverse sidewall 304 and the second transverse sidewall (see 802 in FIG. 8). The transverse direction, as referred to herein, is illustrated by directional arrow 306.

In accordance with an aspect of the invention, a transverse spacing of the transverse sidewalls 304, 802 of the arc chamber 302 may be selected to provide a transverse arc compression ratio (TACR) which is about 2.0 or less. TACR is defined herein as Ts/d, where Ts is the transverse spacing between the sidewalls (i.e., between sidewall 304 and the sidewall 802 (FIG. 8) of the center member 106) in a transverse direction and measured along a path 326 of a moveable electrical contact 310, and d is a maximum transverse contact face dimension (e.g., a diameter) across a contact face of the moveable electrical contact 310, as measured in the transverse direction 306. Controlling these dimensions in accordance with the TACR improves arc extinguishment upon separation of the electrical contacts. Advantageously, this may enable making all the breaker components in the current path smaller thereby contributing to an ability to provide a low profile width.

Figure 6:
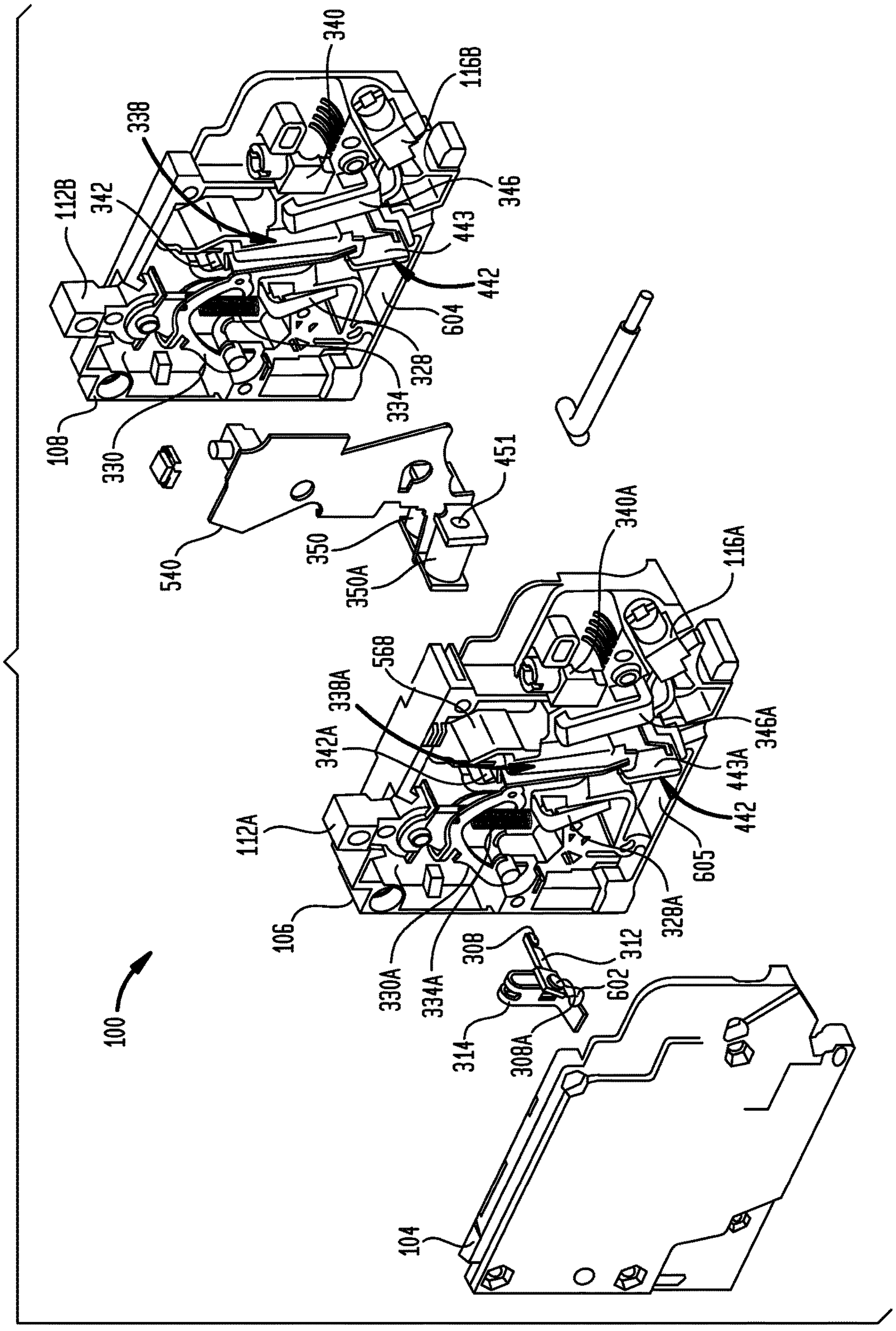
FIG. 6 is an exploded perspective view illustrating various components of an electronic circuit breaker according to embodiments of the invention.

The depicted electronic circuit breaker 100 includes a stationary electrical contact 308, shown dotted because it is located on the opposite side of a contact terminal 312 shown. The stationary electrical contact 308 and the moveable electrical contact 310 are positioned, and included, within the space of the arc chamber 302. The stationary electrical contact 308 may be secured (e.g., welded) to the contact terminal 312, which connects to a power terminal 314 by a suitable electrical conduit, such as an insulated wire or braided wire, for example (See 602 of FIG. 7). The stationary contact 308 being provided on the contact terminal 312 is also shown in FIG. 6. The power terminal 314 may be received over a stab (FIG. 11A) of a panelboard (FIG. 11A), and may provide power to the respective branches and the electrical circuits protected by the electronic circuit breaker 100. However, it should be understood that the present invention is applicable to multi-pole electronic circuit breakers having two or more phases of power entering wherein such multi-pole electronic circuit breakers may include two or more power terminals of conventional construction, for example.

The arc chamber 302 may be further defined by end walls 316, 318, in a first crosswise dimension as indicated by arrow 320, and by end walls 322, 324 in a second crosswise dimension as indicated by arrow 325. Upon tripping of the electronic circuit breaker 100, the moveable electrical contact 310 moves along the travel path 326 to a maximum as-separated condition (i.e., in a tripped position, as shown). Tripping of the electronic circuit breaker 100 moves a contact arm 328, and thus the moveable contact 310 along the travel path 326. This separation causes an electrical arc as the current provided to an electrical circuit protected by the branch of electronic circuit breaker 100 is broken, and the arc chamber 302 may rapidly extinguish the arc.

Again referring to FIG. 3, the tripping may be accomplished by hand tripping by a person moving the handle 112B from an On to an Off position. The throwing of the handle 112B causes the handle 112B causes a spring 334 (e.g., a coil spring) to exert a force on the contact arm 328 causing the contact arm 328 to pivot relative to a lower portion of the handle 112B (see FIG. 8) and moves the contact arm 328 along the travel path 326 to the maximum as-separated condition, i.e., a tripped position (as shown in FIG. 3).

In other instances, a tripping unit 336 of the tripping mechanism 331 may trip the electronic circuit breaker 100 when a persistent over current condition is experienced by the tripping unit 336 and causes a portion of the unit to exceed a predetermined temperature threshold. The tripping unit 336 may include a magnet 338, a bimetal member 339 received alongside of the magnet 338, and an armature 342. The bimetal member 339 is displaceable (in bending) towards the magnet 338 responsive to increased resistive heating (and a resultant temperature increase) of the bimetal member 339, such as due to a persistent over current situation. Additionally, if a short circuit condition is experienced, the high current through the bimetal member 339 will cause the magnet 338 to attract the armature 342 and thereby tripping the electronic circuit breaker 100. In the persistent over current instance, the bimetal member 339 is caused to contact the armature 342 thereby disengaging a latching surface 344 of the armature 342 from a triggering surface 330T of the cradle 330. In the short circuit instance, the magnetic attraction of the armature 342 to the magnet 338 causes the latching surface 344 of the armature 342 to disengage from the triggering surface 330T of the cradle 330. In each instance, this trips the electronic circuit breaker 100 and causes the cradle 330 to rotate clockwise about a cradle pivot 332 and cause separation of the electrical contacts 308, 310 by way of the spring 334 exerting a force to cause a counterclockwise rotation of the contact arm 328. Upon tripping, the rotational excursion of the cradle 330 may be limited by coming to rest on a stop 345 formed on the armature 342 or on the housing portion 108.

In yet another instance, tripping of the electronic circuit breaker 100 may be accomplished automatically upon an electronic processing circuit (FIG. 5A) in the electronic circuit breaker 100 determining that an unwanted electrical condition exists in one of the protected electrical circuits attached thereto. This may be determined for one or both branches upon processing a signal provided from a sensor 346 coupled to the electronic processing circuit. The sensor 346 may be any suitable sensor for determining an electrical condition within the electronic circuit breaker 100. For example, the sensor 346 may be a coil type sensor. The sensor 346 may be provided adjacent to an electrical strap 348 extending between, and electrically connecting, the load terminal 340 to a first end of the bimetal member 339. In the depicted embodiment, the electrical strap 348 is a metal strap, which may be bent in the crosswise directions 320, 325 at various locations along its length. The electrical strap 348 may have a cross-sectional area, which is rectangular, for example. Other shapes may be provided. An end of the bimetal member 339 may be secured to the electrical strap 348, such as by welding, for example. The electrical strap 348 may also be welded to the load terminal 340. In the depicted embodiment, the electrical strap 348 may extend past the bimetal member 339 and include a cantilevered portion 348A. This cantilevered portion 348A may be contacted by a calibration screw 362 to adjust a position of the bimetal member 339 relative to the armature 342 thereby calibrating the tripping unit 336. Also shown in FIG. 3 is a pivot element 349 which supports the magnet 338 and allows limited pivoting thereof. The limits of the pivoting are set by stops formed in the housing portion 108, for example. The pivot element 349 may be a separate component or a part of the housing portion 108. A calibration screw 362 may also be mounted in a base of the pivot element 349.

Again referring to the controlled tripping aspect of the invention, upon determining that an unwanted condition exists in the protected circuit (e.g., an arc fault, or a ground fault, etc.), the electronic processing circuit 540 (FIG. 6) may cause an actuator 350 to move the armature 342. For example, the armature may be moved at a first end thereof, and cause a disengagement of the latching surface 344 from the triggering surface 330T of the cradle 330. This, in the manner previously discussed, separates the electrical contacts 308, 310 from one another and interrupts the protected electrical circuit connected to the branch. These tripping events, due to over current, short circuit, or experiencing an unwanted electrical condition in the protected electrical circuit, may cause an electrical arc, which may be rapidly extinguished within the arc chamber 302.

Figure 5A:
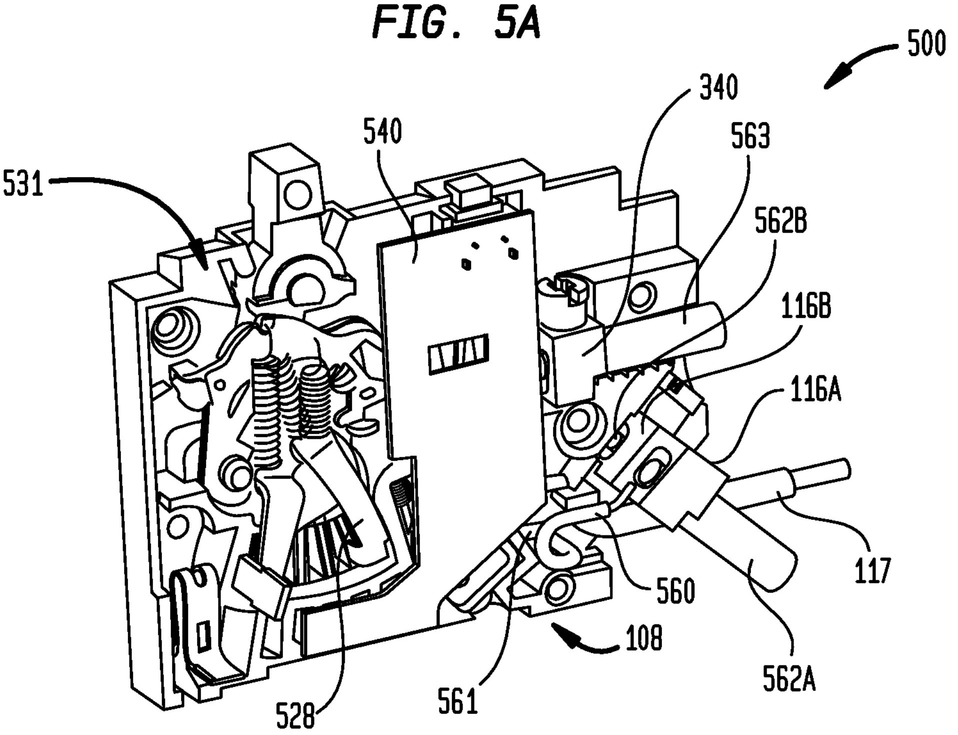
FIG. 5A is a perspective view illustrating a subassembly of a portion of the components of an electronic circuit breaker according to embodiments of the invention.

In the depicted embodiment, the actuator 350 may be an electromagnet, which may include a magnetic pole, which, upon energizing the actuator 350, magnetically attracts and moves the armature 342. In this embodiment, the armature 342 is made from a ferromagnetic material, such as steel. However, any suitable magnetically permeable material may be used. In optional embodiments, the actuator 350 may be a solenoid or other type of actuator, which is adapted to move the armature 342 upon command from the electronic processing circuit 540 (FIG. 5A). In the presently depicted embodiment, the actuator 350 is located in a pocket formed adjacent to the wall 316. In operation, engaging the armature 342 at the first end enables the actuator 350 to be located along a back side of the circuit breaker 100 opposite from the handle side, and within the space formed by an interaction of the first housing portion 108 and the center housing portion 106 (FIG. 1). This enables components of the triggering mechanism 331 (e.g., cradle) to be made relatively smaller, and frees up space located centrally within the circuit breaker 100 to compactly house the other tripping components and electronic processing circuit 540 (FIG. 5A) thereby contributing to achieving a low profile.

Again referring to FIG. 3, and in accordance with another aspect, the arc chamber 302 may include one or more recesses 352 formed (e.g., molded) into the first transverse sidewall 304. Such recesses 352 may be optionally or additionally provided in the second sidewall 808 (FIG. 8), as well. These recesses 352 may receive a portion of the electrical arc generated by separation of the electrical contacts 308, 310 and promote rapid arc extinguishment within the electronic circuit breaker 100. In the depicted embodiment, multiple recesses 352 comprising pockets or holes formed (e.g., molded) into in the transverse sidewall 304 are provided wherein the openings thereof are located on the sidewalls.

In particular, the recesses 352 may be provided alongside of the travel path 326, and in some embodiments, on both sides of the travel path 326 in the first crosswise direction 320. Again, rapid arc extinguishment may contribute to being able to reduce the size of the current carrying components and, thus, may enable lowering a transverse profile of the electronic circuit breaker 100. A further description of the arc chambers may be found in co-assigned U.S. Pat. No. 8,164,018 entitled "Circuit Breaker Arc Chambers And Methods For Operating Same," the disclosure of which is hereby incorporated by reference herein in its entirely.

Figure 4A:
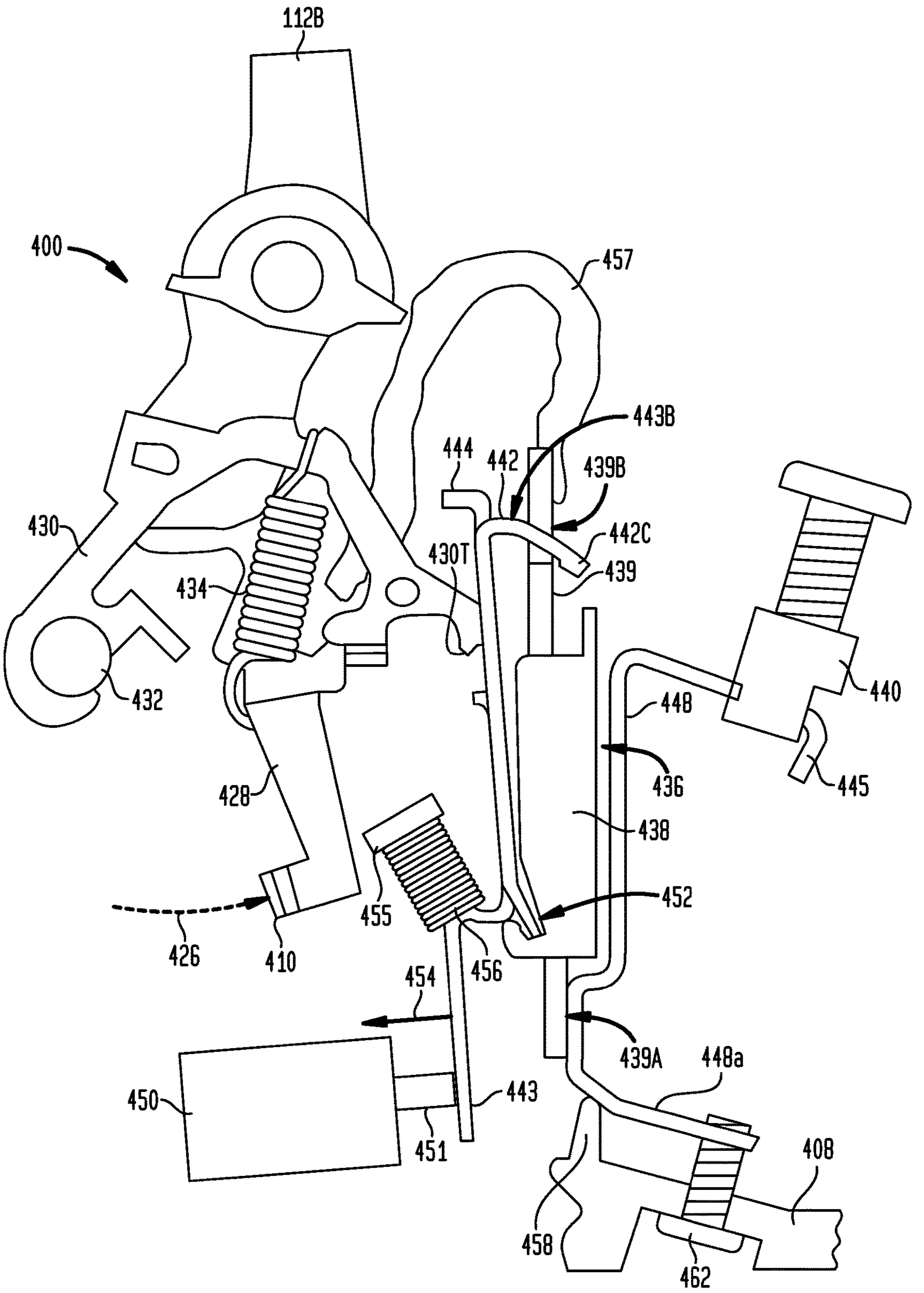
FIG. 4A is a side view illustrating a tripping mechanism that may be employed in a circuit breaker, such as the electronic circuit breaker according to embodiments of the invention.
Figure 4E:
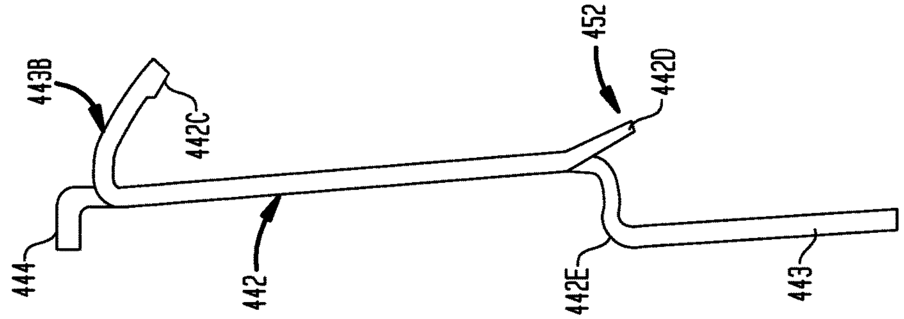
FIG. 4E is a side view illustrating the armature of FIG. 4D.
Figure 4D:
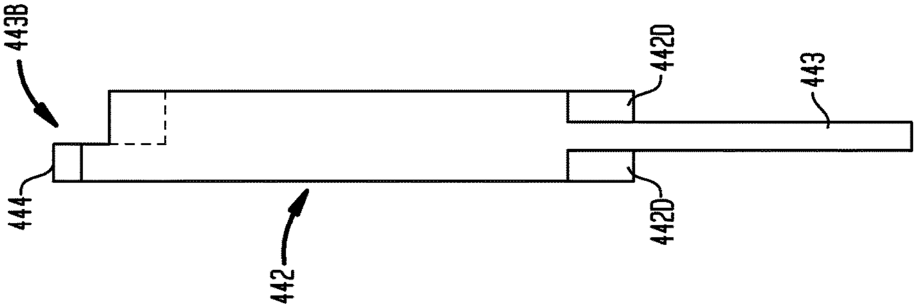
FIG. 4D is a front view illustrating an armature of the tripping unit of FIG. 4A.

With reference to FIGS. 4A-4E, an embodiment of a tripping mechanism 400 according to another broad aspect of the invention is described, as are components thereof. The tripping mechanism 400 may include a cradle 430, having a triggering surface 430T, which when tripped (e.g., due to over current, short circuit, or by controlled actuation), disengages from a latching surface 444 located at a second end 443B of an armature 442 and rotates clockwise about a cradle pivot 432. The cradle pivot 432 is shown in FIG. 4A, while the rest of housing portion, except for housing extension 455 and housing projection 458 on housing portion 408, is not shown for clarity. As described above, this rotation causes a spring 434 (e.g., a coil spring) to exert a force to move the contact arm 428 along the travel path 426 (shown dotted) to the maximum as-separated condition, i.e., a tripped position. The maximum as-separated position may be determined by a stop, such as the end wall 324 (See FIG. 3). Other types of stops may be used.

Figure 4C:
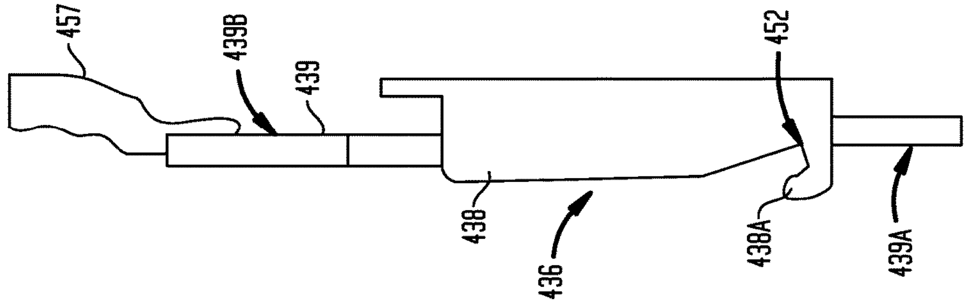
FIG. 4C is a side view illustrating the tripping unit of FIG. 4B.
Figure 4B:
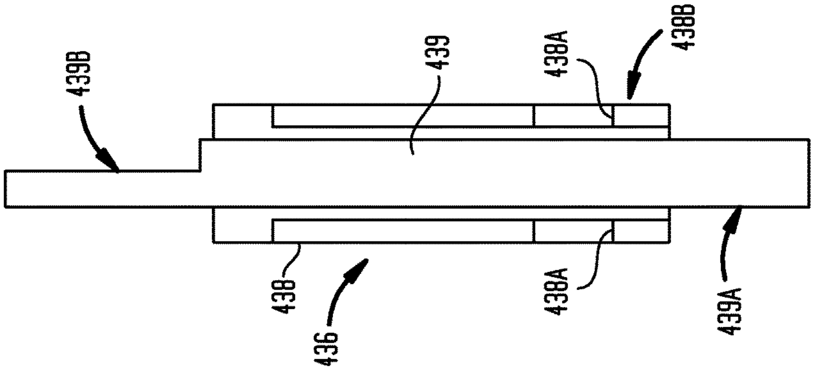
FIG. 4B is a front view illustrating a portion of a tripping unit of the tripping mechanism of FIG. 4A.

The tripping mechanism 400 may also include a low-profile tripping unit 436, also shown in FIGS. 4B and 4C, which is adapted to trip the circuit breaker under a variety of conditions. For example, the tripping unit 436 may trip the circuit breaker when the tripping unit 436 experiences a persistent over current condition or upon experiencing a short circuit condition, or upon active actuation by the actuator 350. The tripping unit 436 may include a magnet 438, a bimetal member 439 received alongside of the magnet 438, and an armature 432. In the depicted embodiment, as best shown in FIG. 4B, the bimetal member 439 is received between sidewalls of the magnet 438. The bimetal member 439 may be generally rectangular in shape and may include two metals with different thermal expansion coefficients, such that an end 439B of the bimetal member 439 is displaceable (flexes) towards the magnet 438 responsive to persistent over current exposure, which causes a threshold temperature to be exceeded due to resistive heating of the bimetal member 439. This causes the second end 439B of the bimetal member 439 to contact an engagement portion (e.g., a bent tab 442C) of the armature 442 at the second end 443B of the armature 442 thereby disengaging the triggering surface 430T of the cradle 430 from a latching surface 444 of the armature 442 at the second end 443B. In turn, this causes rotation of the cradle 430, tripping of the circuit breaker, and movement of the contact arm 428 and moveable electrical contact 410 along the travel path 426 thereby separating the moveable electrical contact 410 from a stationary contact (not shown in FIG. 4A).

In the case of a short circuit being experienced (e.g., very high current) in the protected circuit, a high current flows through the bimetal member 439. This induces a magnetic field in the magnet 438 which causes the armature 442 be attracted to the sidewalls of the magnet 438 and also to pivot on the magnet 438. This motion disengages the latching surface 444 of the armature 342 from the triggering surface 430T of the cradle 430 and trips the circuit breaker including the tripping mechanism 400.

In the depicted embodiment, an electrical strap 448 may be provided and connected to a component of the tripping unit 436. In some embodiments, the electrical strap 448 may extend between, and electrically connect, the load terminal 440 to the bimetal member 439 at a first end 439A thereof. The electrical strap 448 may be as described in the previous embodiment, and may be securely fastened to the first end 439A of the bimetal member 439 (e.g., such as by welding, for example). The electrical strap 448 may also extend through the load terminal 440 and may be also be welded thereto. A tab 445 may extend through the load terminal 440 and may be bent. The tab 445 may be used to position the electrical strap 448 and load terminal 440 into a pocket or slot formed in the housing portion (e.g., housing portion 108), for example. In some embodiments, the electrical strap 448 may extend beyond the bimetal member 439 thereby forming a cantilevered end 448A beyond the connection between the bimetal member 439 and the electrical strap 448. Exerting a force on the cantilevered end 448A by threading calibration screw 462 against the housing portion 408 causes the cantilevered end 448A to flex. Upon flexure, the electrical strap 448 (e.g., the cantilevered end 448A) may contact a projection 458. This, in turn, elastically flexes the electrical strap 448 and causes the second end 439B of the bimetal element 439 to adjust its position relative to the location of engaging portion 442*c* of the armature 442. Accordingly, this feature may be used to accomplish calibration of the tripping unit 436.

In the case of an electronic circuit breaker, the tripping mechanism 400 may also include an actuator 450 (e.g., an electromagnetic actuator) which may have a magnetizable pole 451 adapted to attract the armature 442. The actuator 450 may be positioned adjacent to the travel path 426 of the moveable contact 410 on a side of the circuit breaker opposite from the location of the handle 112B.

In the depicted embodiment, the actuator 450 may engage the armature 442 at the first end 443 upon command from the electronic processing circuit 540 (FIG. 5A), and magnetically attract and pull the armature 442 towards the magnetizable pole 451 (e.g., in the direction of arrow 454). This causes the armature 442 to pivot about a pivot location 452. In this embodiment, the pivot location 452 on the armature 442 is provided between the first end 443 and second end 443B of the armature 442. According to some embodiments, the armature 442 may pivot at a location on the magnet 438. In particular, the armature 442 may pivot on a portion of the magnet 438. The pivot location 452 on the magnet 438 may be formed by tabs 438A provided on either side of the first end 438B of the magnet 438 as shown in FIGS. 4B and 4C. Tabs 442D formed on the armature 442 may be received in the slots formed by tabs 438A (See also FIGS. 4B-4E). The tabs 442D may be smaller (thinner) than the slots formed by tabs 438A, and, thus, may provide a pivot at the pivot location 452 such that the armature 442 may pivot relative to the magnet 438. This movement of the armature 442 causes a compression of a spring 456 (e.g., a coil spring) mounted on a spring receiver 442E abutting housing extension 455, and thereby disengagement of the latching surface 444*a* from a triggering surface 430T of the cradle 330. This, in the manner previously discussed, causes the cradle 430 to rotate clockwise, moving the contact arm 428, and separating the moveable electrical contact 410 from the stationary contact (not shown in FIG. 4A). As shown in FIGS. 4A and 4C, an electrical conduit 457 (e.g., a braided line) may connect the second end 439B of the bimetal member 439 to the contact arm 428.

Figure 5B:
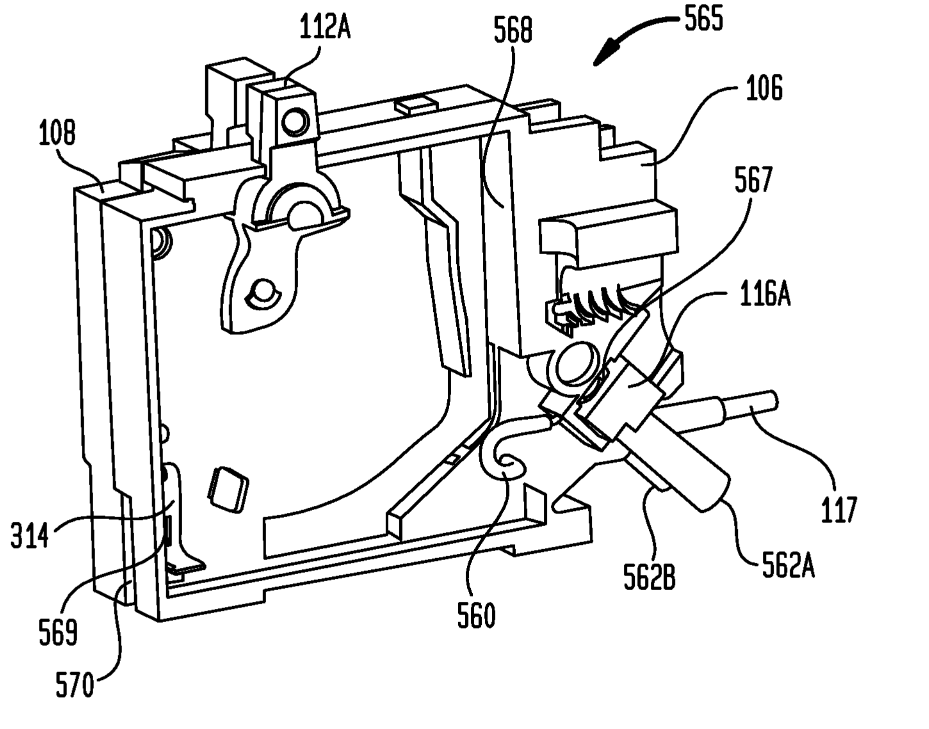
FIG. 5B is a perspective view illustrating a second subassembly of a portion of the components of an electronic circuit breaker according to embodiments of the invention.

Now referring to FIGS. 5A and 5B, further subassembly views of are provided. In FIG. 5A, the previously-described portion of the circuit breaker 100 of FIG. 3 is provided as a subassembly 500, further including an electronic processing circuit 540 installed to contact and abut the right housing portion 108. The electronic processing circuit 540 may be provided in the form of a printed circuit board, for example. The electronic processing circuit 540 may be mounted in a pocket of the housing portion 108 or on a feature formed in the electronic processing circuit 540 (e.g., a hole) and is sandwiched between the portions 108, 106. Further, the subassembly 500 may include one or more load neutral terminals 116A, 116B, at least one of which is partially retained and received in a pocket of the right housing portion 108. The neutral terminals 116A, 116B may be interconnected to the electronic processing circuit 540 through electrical wires 560, 561 and provided as an electrical subassembly with the electronic processing circuit 540. Further, a neutral line pigtail 117 may interconnect with the electronic processing circuit 540 and extend out of a bottom of the housing portion 108. Sensor 346 may be connected to the electronic processing circuit 540 via a wire and electrical connection (not shown). Electrical conduits 562A, 562B, and 563 are shown connected to the load neutral terminals 116A, 116B and load terminal 340. Such conduits 562A, 562B, 563 do not form a part of the present electronic circuit breaker 100, but are part of the protected circuit and are included to illustrate connections to the protected circuit. The conduits 562A, 562B, 563 may be any suitable gauge required for the electrical circuit, such as AWG 8, AWG 10, AWG 12 or AWG 14, for example. The tripping mechanism 531 is shown in multiple positions to illustrate the motion of the contact arm 528.

In FIG. 5B, the previously described subassembly 500 is further assembled with additional breaker components to form a second subassembly 565. In particular, the center housing portion 106 is provided in an abutting relationship to the right housing portion 108, and handle 112A is provided. The load neutral terminal 116A may be received in a pocket 567 of the center housing portion 106. A hole 568 formed in the housing portion 106 provides accessibility to the electronic processing circuit 540 by the other branch (to be described further herein). The power terminal 314 is received in a pocket 569 formed in the center housing portion 106. Together, the right housing portion 108 and center housing portion 106 interface to provide a slot 570 which may receive a stab of a panelboard (FIG. 11B).

FIG. 6 is an exploded view of the various components of the duplex electronic circuit breaker 100 according to embodiments of the present invention. Illustrated are the left housing portion 104, center housing portion 106 and right housing portion 108. Also illustrated is the electronic processing circuit 540 sandwiched between the right and center housing portions 108, 106. As should be apparent, the circuit breaker components included in the second branch in the center housing portion 106 may be the same as the first branch included in the right housing portion 108, as were described in FIG. 3. For example, they may include identical handles 112A, 112B, contact arms 328, 328A, cradles 330, 330A, springs 334, 334A, magnets 338, 338A, and armatures 342, 342A. The center housing portion 106 may include a load terminal 340A received in a pocket therein, in a similar manner as the load terminal 340 is received in the right housing portion 108. The center housing portion 106 may include a load neutral terminal 116A received in a pocket therein, in a similar manner as the load neutral terminal 116B is received in the right housing portion 108. As shown, the two housing portions 106, 108 abut and engage each other and retain the terminals 116B and 340 in the electronic circuit breaker 100. Likewise, the portions 104, 106 may abut and engage each other and retain the terminals 116A and 340A in the electronic circuit breaker 100.

The power terminal 314 may include an electrical conduit 602 which electrically connects to the contact terminal 312. Contact terminal 312 may be received through the center housing portion 106 and may include the stationary electrical contacts 308, 308A for each pole (on either end of the contact terminal 312). Optionally, the power terminal 314 may be connected to separate contact terminals, each including a stationary electrical contact 308, 308A. In the depicted embodiment, the electronic processing circuit 540 has mounted thereon, on opposite sides thereof, a first actuator 350 which is received in a pocket 604 formed in the right housing portion 108 and second actuator 350A which is received in a through hole 605 in the center housing portion 106. The actuators 350, 350A may be identical electromagnetic actuators, and may each include magnetizable pole 451 (only one shown in FIG. 6) which is positioned at a location adjacent to the first end 443, 443A of the armatures 442, 442A. Although not shown, sensors 346, 346A may be sub-assembled and connected to the electronic processing circuit 540 as an integral unit by conduits (not shown) and the sensor 346A may be received through the hole 568 in center housing portion 106 and received on the other side of center housing portion 106.

Figure 7:
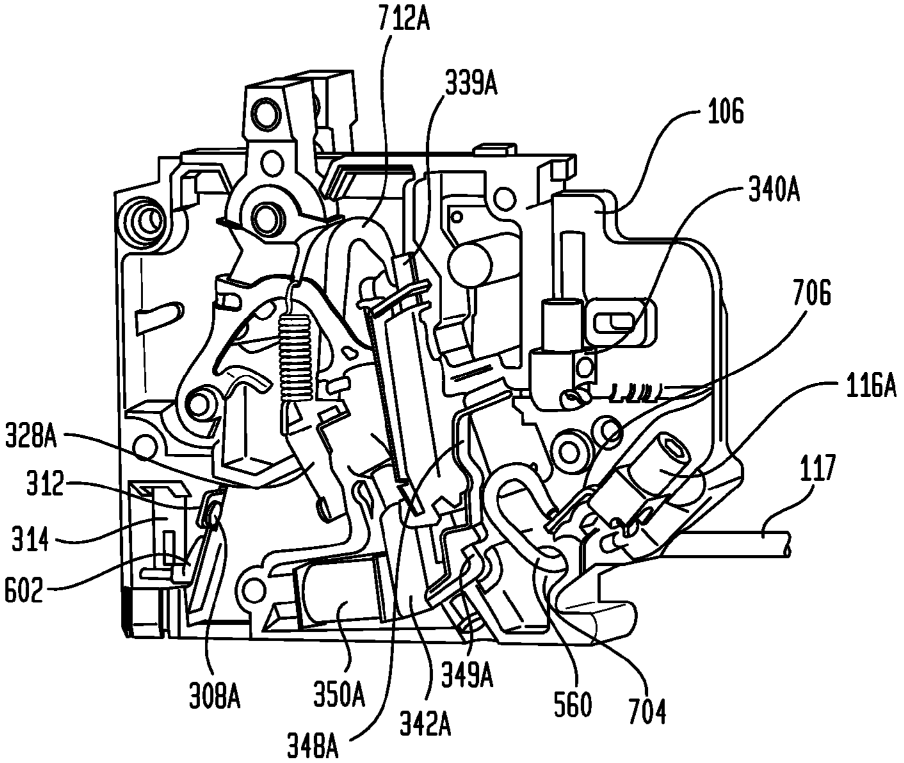
FIGS. 7 and 8 are perspective views of opposite sides of a subassembly of a portion of the components of an electronic circuit breaker according to embodiments of the invention.
Figure 8:
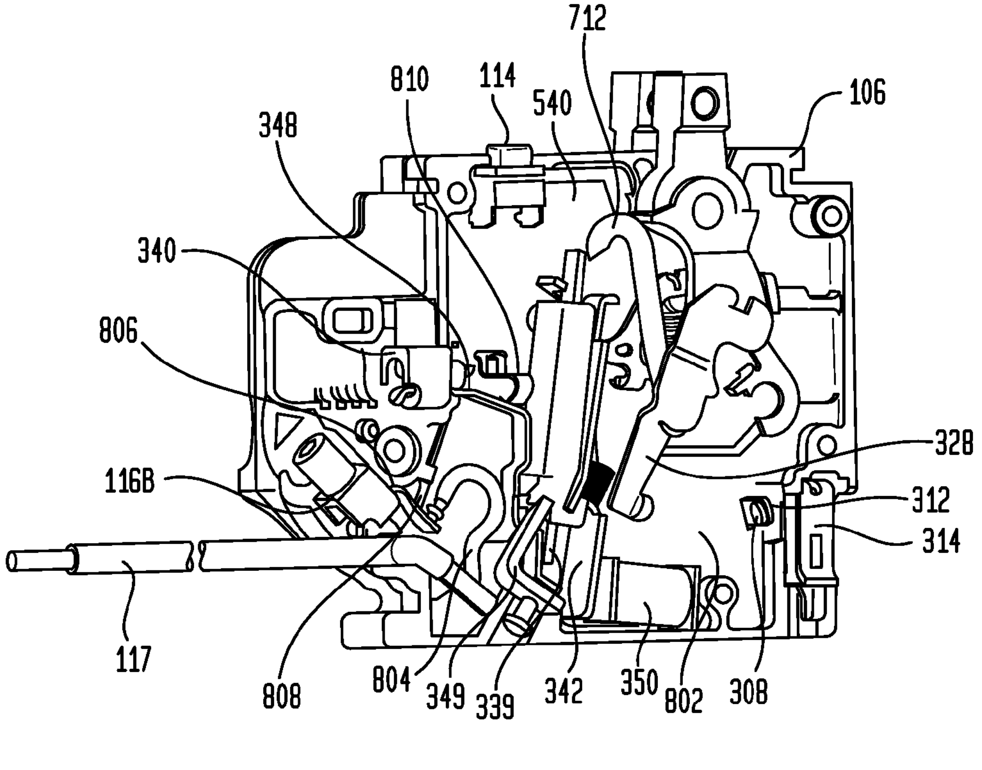

FIGS. 7 and 8 illustrate views of the center housing portion 106 from two different sides to illustrate the positioning and orientation of the breaker components of the two branches of the electronic circuit breaker 100. For example, in FIG. 7, the contact terminal 312 including the stationary electrical contact 308A is shown installed through the center housing portion 106. Also shown is the connection and positioning of the conduit 602 between the contact terminal 312 and the power terminal 314. The electrical conduit 560 may be connected to the load neutral terminal 116A as shown by passing through a hole 704 in the center housing portion 106. The conduit 560 may be secured (e.g., by soldering) to a connector 706, which may be received through, or otherwise connected (e.g., by welding) to the load neutral terminal 116A.

In FIG. 8, the contact terminal 312 including the stationary electrical contact 308 is shown installed through the center housing portion 106. Also shown is the positioning of the power terminal 314 in a pocket formed in the center housing portion 106. On this side, electrical conduit 561 may be connected to the load neutral terminal 116B as shown. The electrical conduit 561 may be secured (e.g., by soldering) to a connector 806, which may be received through, or otherwise connected (e.g., by welding) to the load neutral terminal 116B. The neutral line pigtail 117 is shown received in a recess formed in the center housing portion 106. The center housing portion 106 and right housing portion 108 (FIG. 1) may engage each other to position and secure the neutral line pigtail 117 in its position, as shown. An electrical conductor 808 may attach to the electronic processing circuit 540 and may connect to the conductor 561. Also shown is the connection of the test button onto the electronic processing circuit 540. In some embodiments, the electronic processing circuit 540 may include a conductor 810 extending therefrom, which may be appropriately positioned such that upon installation of the electrical strap 348, contacting engagement with the electrical strap 348 is made. This may provide power to the electronic processing circuit 540. A similar connection to the electrical strap on the 348A may be made on the other side.

Also clearly illustrated in FIGS. 7 and 8 are the connections of the electrical straps 348, 348A to the load terminals 340, 340A and to the first ends of the bimetal members 339, 339A, as well as the pivoting element 349, 349A. Likewise, electrical conduits 712, 712A (e.g., braided wires) are shown electrically connecting the bimetal members 339, 339A to the contact arms 328, 328A. In FIG. 8, it is illustrated that the electronic processing circuit 540, in the form of a printed circuit board, is received into a pocket formed in the center housing portion 106. Accordingly, the printed circuit board is accessible to the electrical components (e.g., sensor 346, 346A) on either side of the central housing member 106. Additionally, as can be seen from these two views, upon installation of the printed circuit board, the actuator 350, 350A are positioned to engage with the armatures 342, 342A. It should be understood that the printed circuit board may be split into multiple pieces and provided at different locations within the electronic circuit breaker wherein different functions may be provided on each board piece.

Figure 9A:
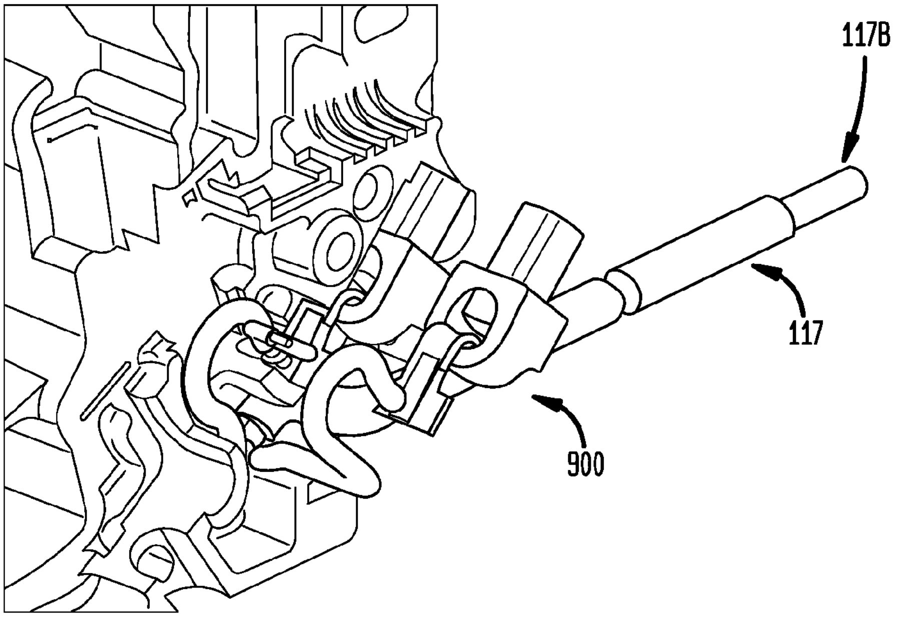
FIGS. 9A and 9B are perspective views of the load neutral terminals and other electrical harness components of an electronic circuit breaker according to embodiments of the invention.
Figure 9B:
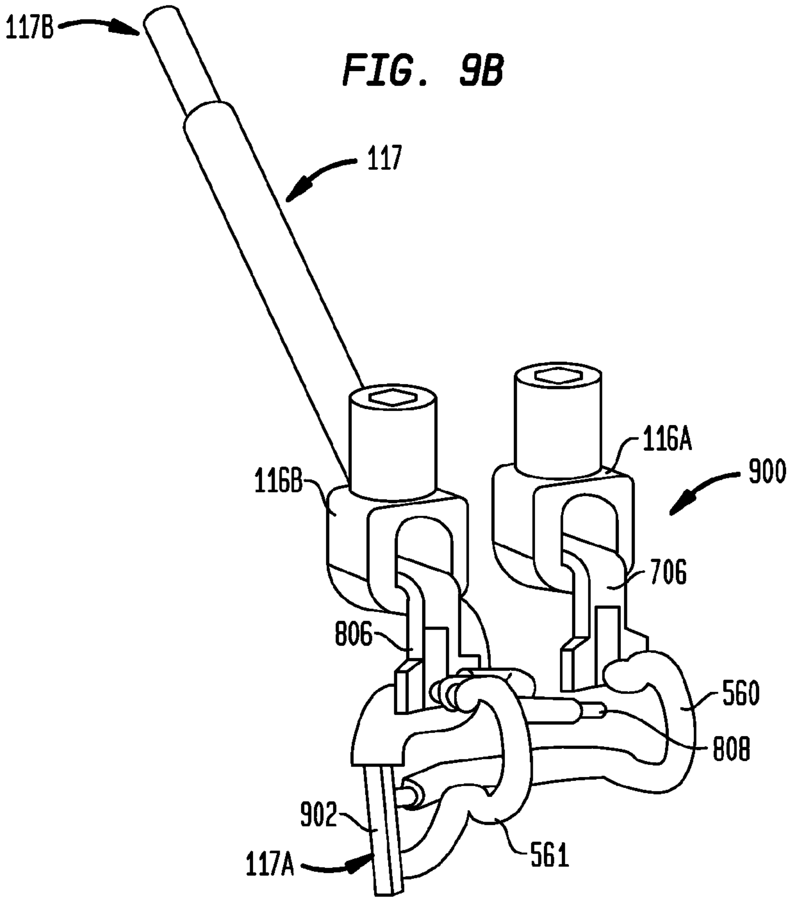

FIGS. 9A and 9B are perspective views of the electrical harness assembly 900. The harness assembly 900 may include the neutral line pigtail 117 having a first end 117A and a second end 117B. The first end may be secured (e.g., by soldering) to a tang 902 of the neutral line pigtail 117, whereas the second end 117B may be adapted to be attached to a panelboard neutral. As described above, electrical conduits 560, 561 attach to the load neutral terminals 116A, 116B by way of connectors 706, 806. Another end of the electrical conduits 560, 561 may attach (e.g., by soldering) to the tang 902. Conductor 808 may be attached to the electronic processing circuit 540.

Figure 10:
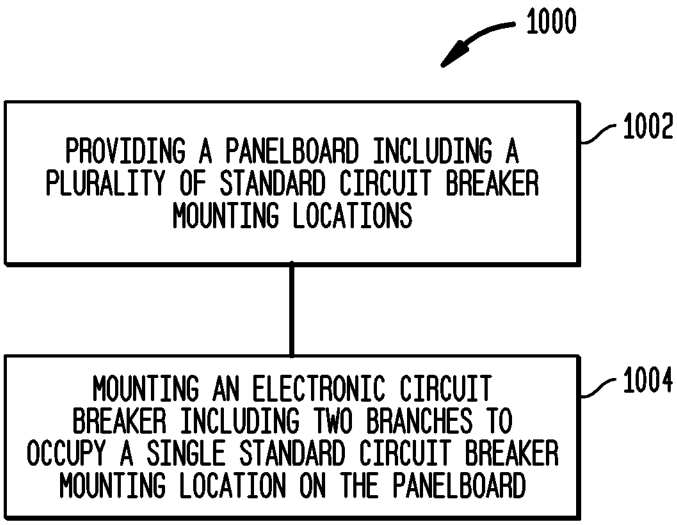
FIG. 10 is a flowchart illustrating a method according to embodiments of the invention.

FIG. 10 is a flowchart illustrating a method of installing an electronic circuit breaker according to an aspect of the present invention. The method includes providing a panelboard including a plurality of standard circuit breaker mounting locations in 1002. Each of the standard circuit breaker mounting locations may include a single stab. The method 1000 further provides, in 1004, mounting an electronic circuit breaker including two branches to occupy a single standard circuit breaker mounting location in the panelboard. In some embodiments, a power terminal of the electronic circuit breaker may be coupled to the single stab at each standard circuit breaker mounting location. A standard circuit breaker mounting location on a panelboard is a space in the panelboard that is adapted to receive a single, standard width, single-pole circuit breaker. For example, a panelboard may be designed to have 6, 8, 12, 16, 32 or 54 standard circuit breaker locations. Panelboards are designed to meet National Electrical Code, NEMA, and Federal Specifications. As should be recognized, because the profile width of the present electronic circuit breaker 100 including two branches is the same as a conventional single-pole circuit breaker, it is now possible to provide greater than 1n load terminals within the panelboard, where n is a number of standard breaker mounting locations within the panelboard.

Figure 11A:
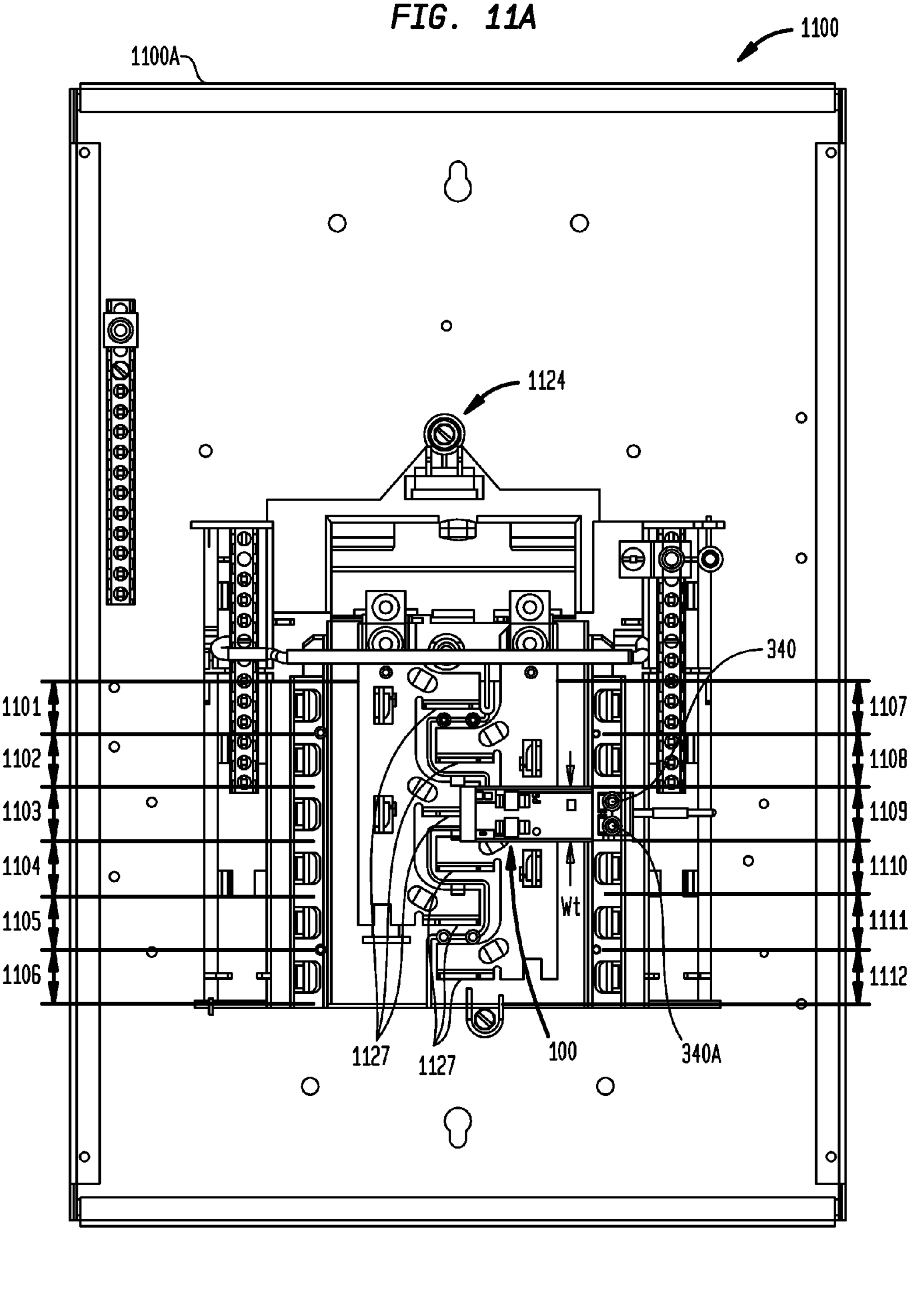
FIG. 11A is a front view of a panel box including a panelboard having an electronic circuit breaker including two branches installed thereon according to embodiments of the invention.
Figure 11B:
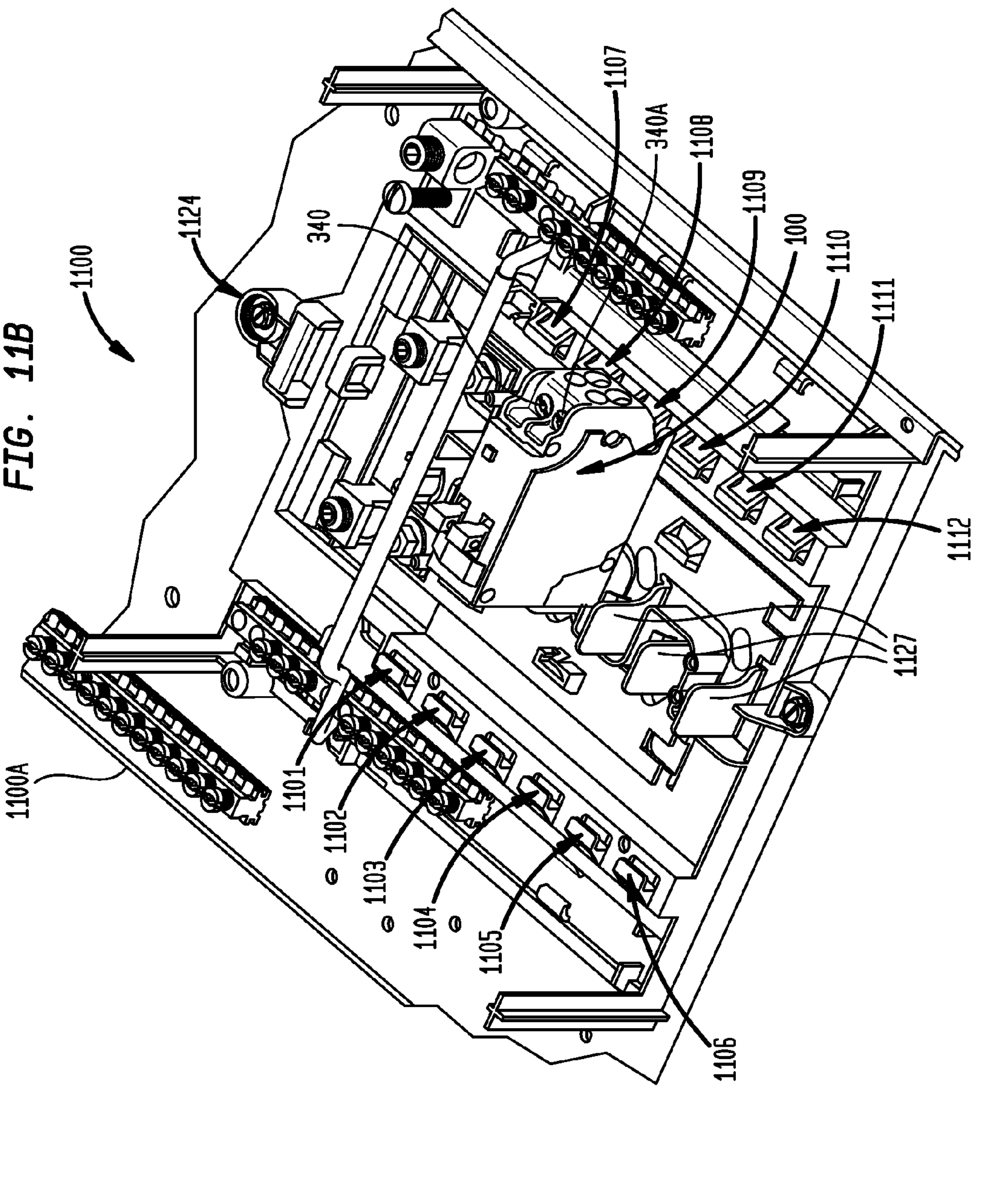
FIG. 11B is a perspective view of a panelboard including an electronic circuit breaker mounted thereon according to embodiments of the invention.

FIGS. 11A and 11B illustrate an electrical panelboard system 1100 including a panelboard 1124, which may include one or more electronic circuit breakers 100 having two branches mounted therein (only one breaker shown). The panelboard 1124 may be received in a panel box 1100A (only a portion shown in FIG. 11B). The panel box 1100A may include a cover, a latching door, and other panel box components (all not shown). The panelboard 1124 includes a plurality of standard circuit breaker mounting locations 1101-1112 (e.g., 1 inch standard circuit breaker locations) thereon. In the depicted embodiment, twelve standard mounting locations are shown. However, a panelboard including more or less standard mounting locations may be provided, such as 4, 8, 16, 32, or 54 standard mounting locations, for example. Each standard circuit breaker mounting location 1101-1112 may include a single stab 1127 or a stab 1127 shared by circuit breakers arranged in an end to end configuration across the panel box 1100A. In the depicted embodiment, six stabs 1127 are provided, and each is shared by two circuit breakers, for a total of twelve standard circuit breaker locations. The electronic circuit breaker 100 is mounted to a single one of the stabs 1127 and may receive a single phase of power therefrom.

Each of the one or more electronic circuit breakers 100 according to the invention exhibits a low profile having a maximum transverse width (Wt) in the transverse direction 306. In particular, Wt may be less than about 1 inch (less than about 25.4 mm) such that the electronic circuit breaker 100 may fit within, and occupy, a single one of the plurality of standard panelboard mounting locations 1101-1112 (the electronic circuit breaker 100 being installed in standard mounting location 1109). As can be seen, within each standard circuit breaker location where an electronic circuit breaker 100 is installed, two load terminals 340, 340A may be accommodated. Furthermore, each electronic circuit breaker 100 may include two load neutral terminals (see FIG. 1). The duplex electronic circuit breaker 100 of the invention may be mounted to occupy a single standard circuit breaker mounting location in the panelboard in the same manner as a standard 1-inch single-pole mechanical circuit breaker may be mounted, for example. Mounting the electronic circuit breaker 100 to the stab 1127 couples the power terminal 314 (FIG. 3) of the electronic circuit breaker 100 to the single-phase power bus so that each branch receives power. As was discussed above, there may be lug assemblies used rather than stabs. In such a case, the electronic circuit breaker may include one or more power terminal lug assemblies.

It should now be apparent that utilizing the electronic circuit breaker 100 within the panelboard may provide greater than 1n load terminals within the panelboard where n is a number of standard breaker locations within the panelboard. In some embodiments, 2n load terminals may be provided. For example, for a standard 12 breaker panelboard (shown in FIG. 11), 24 load terminals may be provided. Other numbers of load terminals between 13 and 24 may be provided based upon the combination of circuit breakers installed in the panelboard. For example, the electronic circuit breaker 100 including two branches of the invention may be installed alongside of any conventional circuit breaker.

Figure 12B:
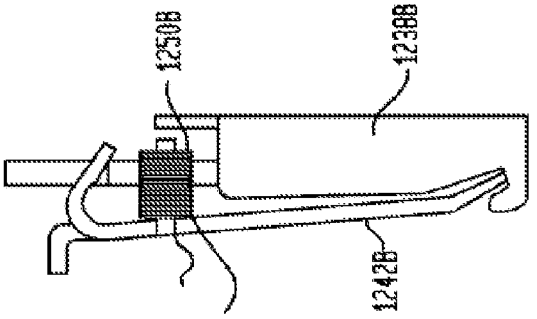
FIGS. 12A and 12B are side views illustrating alternative tripping units according to embodiments of the invention.
Figure 12A:
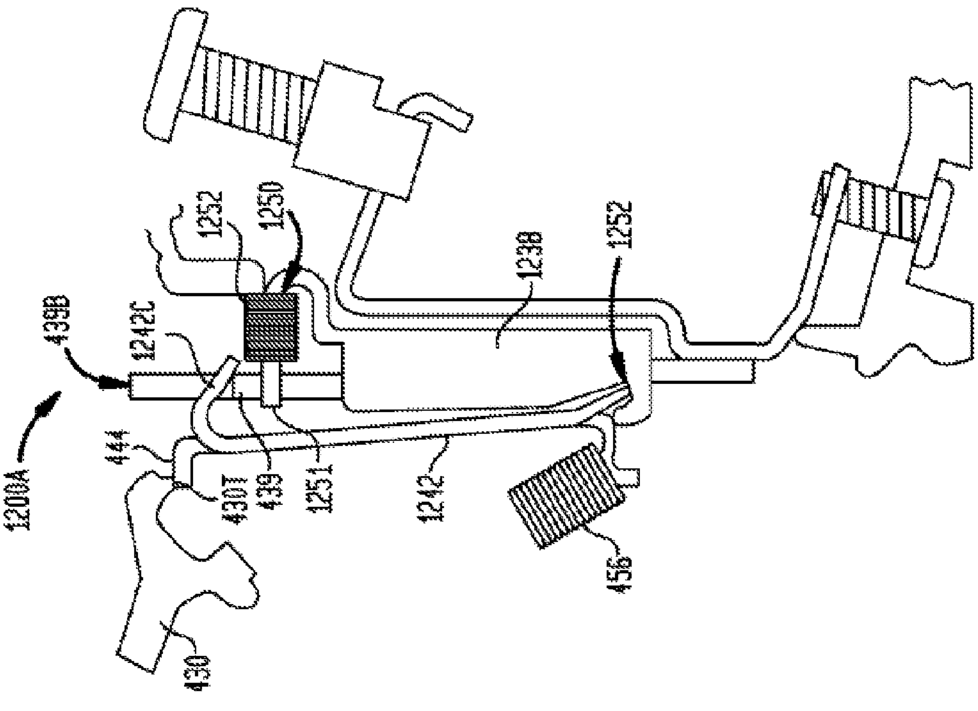

FIG. 12A illustrates another embodiment of a tripping unit 1200 for a circuit breaker. The tripping unit 1200 is similar to the tripping unit 436 described with reference to FIG. 4A, but differs in that an actuator 1250 is formed as part of the magnet 438, such that the magnetizable pole 1251 of the actuator 1250 may magnetically attract the armature 1242. In the depicted embodiment, the actuator 1250 is an electromagnet and is formed on an end of the magnet 1238. However, it should be apparent that the actuator 1250 may be positioned in any manner as long as it is connected to the magnet 1238, and such that a suitable attraction force may be generated to attract the armature 1242 and thereby trip the circuit breaker. Optionally, as shown in FIG. 12B, the coil 1250B may be mounted on a bent tab of the armature 1242B on the second end thereof and energized to attract to the magnet 1238B wherein the bent tab faces the magnet 1238B and functions as a pole.

In this embodiment, the actuator 1250 is an electromagnet including a magnetizable pole 1251 formed from a portion of the magnet 1238. In particular, the magnetizable pole 1251 may be formed from a bent tab on an end of the magnet 1238. A series of wire windings may be wound about the magnetizable pole 1251 to form a coil 1252. In some embodiments, the coil 1252 may be separately formed and slid over the pole 1251 and secured thereto by adhesive, for example. The number of wire windings provided will be chosen to provide a suitable force to displace the armature 1242 a sufficient distance to cause breaker tripping and to ensure clearance with the other components of the tripping unit. The electrical leads from either end of the coil 1252 may be attached to an electronic processing circuit (not shown in FIG. 12A).

In the described embodiment of FIG. 12A, a command from an electronic processing circuit (not shown in FIG. 12A) to the actuators 1250 may induce a magnetic field in the magnet 1238 and produce an attraction force between the magnet 1238 and the armature 1242. This causes movement of the armature 1242 (e.g., pivoting about the magnet 1238) at pivot location 1252, a sufficient distance to cause the latching surface 444 of the armature 1242 to disengage from the triggering surface 430T of the cradle 430 (only a portion of cradle 430 shown). In this embodiment, a tail on the armature 1242 beyond the spring 456 may be removed.

Figure 13A:
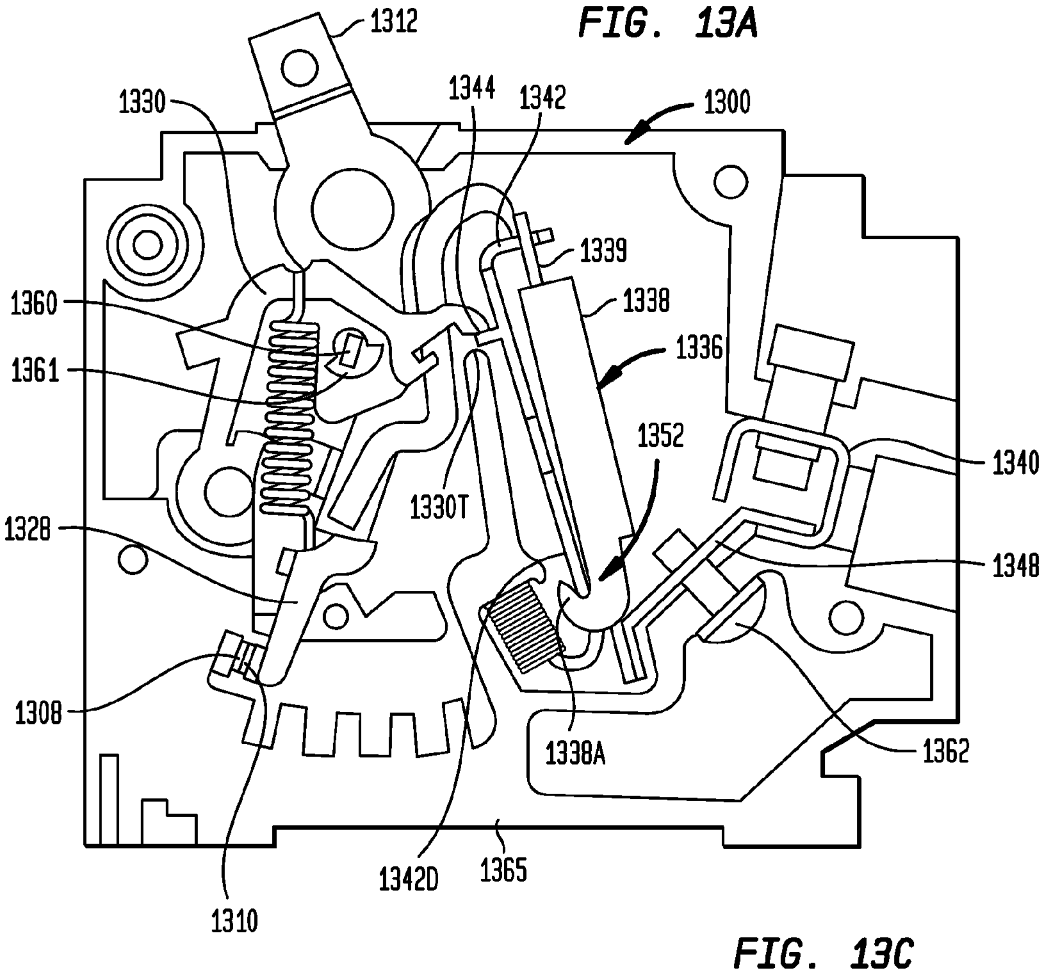
FIG. 13A is a side view of another tripping assembly in a circuit breaker according to embodiments of the invention.
Figure 13B:
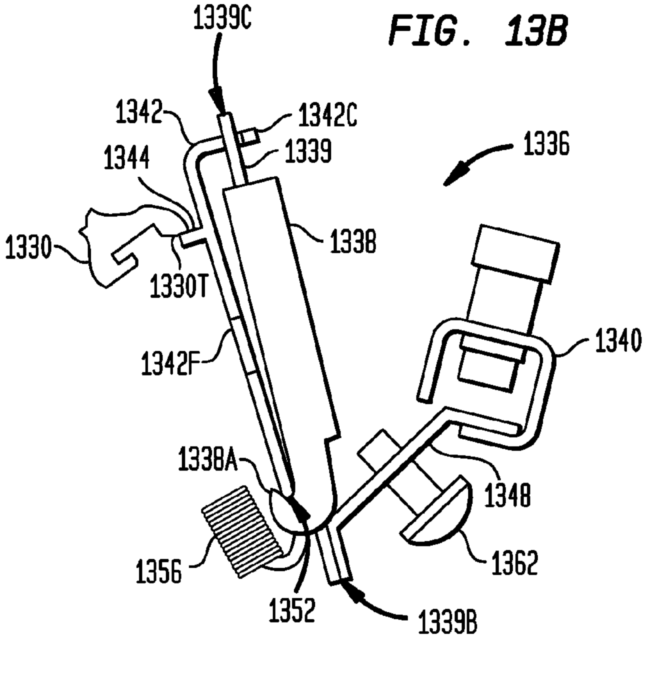
FIG. 13B is a side view of a tripping unit of the tripping assembly of FIG. 13A.
Figure 13C:
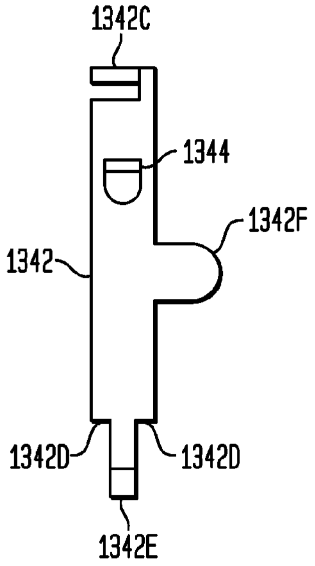
FIG. 13C is a front view of an armature of the tripping unit of FIG. 13B.

Together, FIGS. 13A-13C illustrates another embodiment of a tripping mechanism 1300 for a circuit breaker. This embodiment is similar to the FIG. 4A embodiment, but is designed for use in a single-pole electronic circuit breaker. In this embodiment, in a like manner as in FIG. 4A, the tripping mechanism 1300 includes a tripping unit 1336 having a magnet 1338, a bimetal member 1339 received alongside of the magnet 1338, and an armature 1342. The armature 1342 is pivotable at pivot location 1352 on the magnet 1338. In this embodiment, the pivot location 1352 is formed on the magnet 1338 by tabs 1338A formed on either side of the magnet 1338 in the same manner as is shown in FIGS. 4B and 4C. In this embodiment, the armature 1342 includes tabs 1342D, which may be shoulders formed on the armature 1342 (See FIG. 13C) which may rest in a slot formed by the tabs 1338A. In addition, the armature 1342 may include an engagement portion 1342C which is engageable with the bimetal member 1339 at a moveable end 1339C of the bimetal member. A spring 1356 may be provided on a spring receiver 1342E of the armature 1342 to bias the armature 1342 away from the magnet 1338.

In some embodiments, a tab 1342F may be provided on a side of the armature 1342 and is adapted to be contacted by an actuator (not shown) of the type described herein when the tripping unit 1336 is used within an electromagnetic circuit breaker.

The armature 1342 may also include a latching surface 1344 formed on a tab extending from a body of the armature 1342, which is adapted to engage a tripping surface 1330T on a cradle 1330. In operation, when a persistent over current situation is encountered, engaging portion 1342C will be engaged and contacted by the moveable end 1339C of the bimetal member 1339 as it moves closer to the magnet 1338. This disengages the latching surface 1344 from the tripping surface 1330T of the cradle 1330 (only a portion shown in FIG. 13B) and thereby the tripping mechanism 1300 trips the circuit breaker by causing the cradle 1330 to rotate clockwise and move the contact arm 1328 and the moveable contact 1310 away from the stationary contact 1308. As shown, a tab 1360 on the contact arm 1328 may rotate within a hole 1361 in the backside of the handle 1312. As shown, an electrical strap 1348 may connect between the load terminal 1340 and the first end 1339B of the bimetal member 1339, and may be securely fixed to each (e.g., by welding). A calibration screw 1362 engages the electrical strap 1348 and functions to calibrate a response of the tripping unit 1336. Housing portion 1365 retains the various components (e.g., handle 1312, magnet 1338) load terminal 1340, in pockets formed by interaction of the housing portion 1365 and a conventional cover portion (not shown).

Figure 14A:
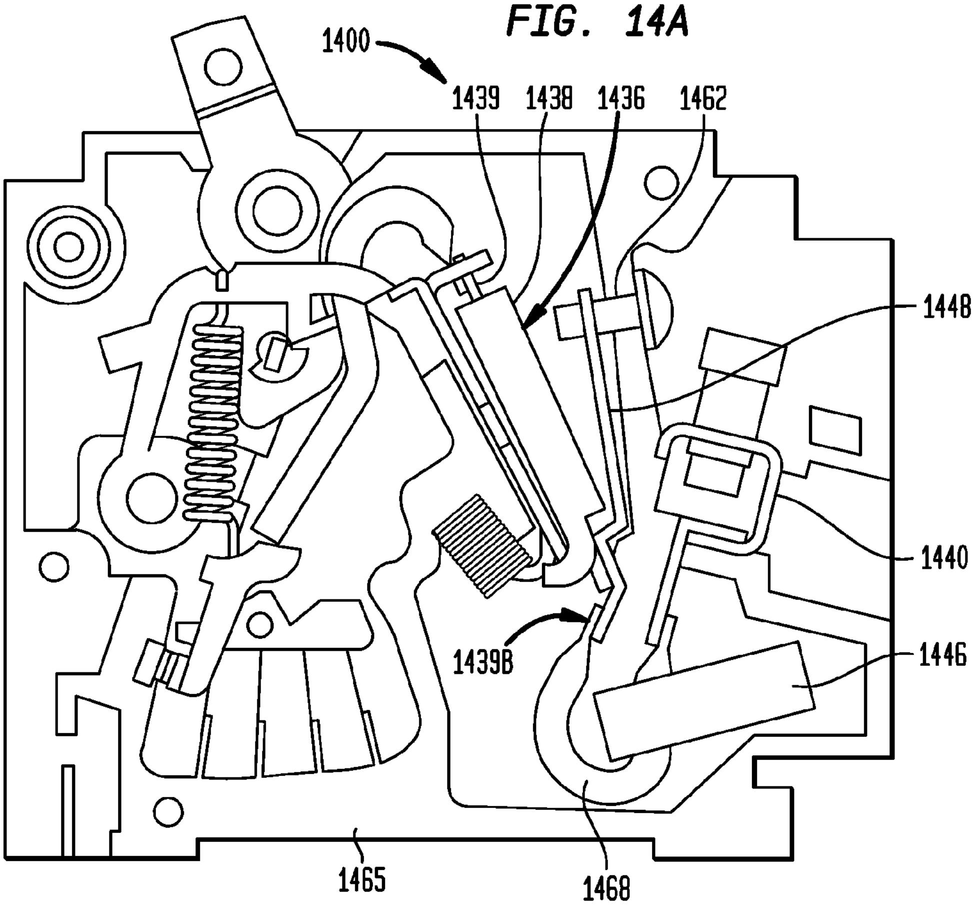
FIG. 14A is a side view of another tripping assembly in a circuit breaker according to embodiments of the invention.
Figure 14B:
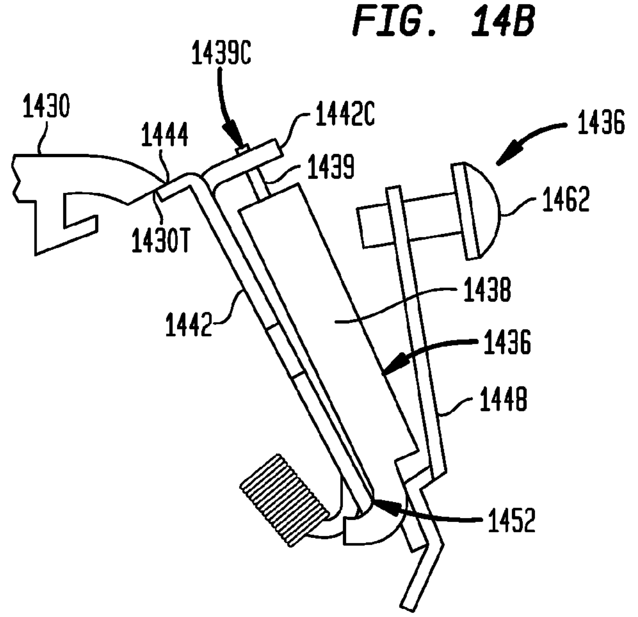
FIG. 14B is a side view of a tripping unit of the tripping assembly of FIG. 14A.
Figure 14C:
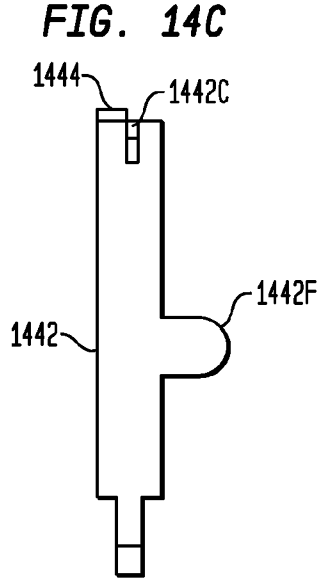
FIG. 14C is a front view of an armature of the tripping unit of FIG. 14B.

FIGS. 14A, 14B and 14C illustrate another embodiment of a tripping mechanism 1400 for a circuit breaker. This embodiment is similar to the FIG. 13A-13C embodiment, but differs in the locations of the latching surface 1444 and the calibration screw 1462. In this embodiment, in a like manner as in FIGS. 13A-13C, the tripping mechanism 1400 includes a tripping unit 1436 having a magnet 1438, a bimetal member 1439 received alongside of the magnet 1438, and an armature 1442. The armature 1442 is also pivotable on the magnet 1438, and the pivot is formed in the same way as described in FIGS. 13A-13C. In the same manner as in the previous embodiment, the armature 1442 may include an engagement portion 1442C, which is engageable with the bimetal member 1439 at a moveable end 1439C thereof.

In some embodiments, such as in electronic circuit breakers, a tab 1442F may be provided on a side of the armature 1442 to be contacted by an actuator, as discussed above. In the depicted embodiment, the armature 1442 may include a latching surface 1444 formed on a tab extending from a body of the armature 1442 at a terminal end that is the farthest away from the pivot location 1452. As described above, the latching surface 1444 disengages from a tripping surface 1430T on a cradle 1430 (only a portion shown in FIG. 14B) when a temperature threshold due to a persistent over current is encountered. As before, engaging portion 1442C is contacted by the moveable end 1439C of the bimetal member 1439. This trips the circuit breaker as described above.

As shown in FIG. 14A, an electrical conduit 1468 may connect between the load terminal 1440 and an electrical strap 1448, which is securely fixed to a fixed end 1439B of the bimetal member 1439 (e.g., by welding). A calibration screw 1462 engages the electrical strap 1448 and a head of the screw 1462 engages a housing portion 1465. When the electrical strap 1448 is flexed in bending, this moves the moveable end 1439C of the bimetal member 1439 and functions to calibrate a response of the tripping unit 1436. A sensor 1446 may be provided to sense an electrical condition (e.g., current) in the electrical conduit 1468 and may be coupled to the electronic processing circuit (not shown).

FIGS. 15A-15D illustrates yet another embodiment of a tripping mechanism 1500 for a circuit breaker. In this instance, the depicted tripping mechanism 1500 is adapted for use in an electronic circuit breaker. This embodiment is similar to the FIGS. 14A-14C embodiment, but differs in the configuration of the engagement portion 1542C, the location of the calibration screw 1562, and the location of the actuator 1550. In this embodiment, in a like manner as in FIGS. 14A-14C, the tripping mechanism 1500 includes a tripping unit 1536 having a magnet 1538, a bimetal member 1539 received alongside of the magnet 1538, and an armature 1542. The armature 1542 is pivotable on the magnet 1538, and the pivot is formed in the same way as described in FIGS. 13A-13C and 14A-14C. Furthermore, the armature 1542 may include an engagement portion 1542C at the second end 1543B, which is engageable with the bimetal member 1539 at a moveable end 1539C thereof. In this embodiment, the pivot element 1449 is formed as part of the housing 1565 and allows pivoting of the magnet 1538 thereabout and towards the armature 1542. In an optional embodiment, the pivot member 1538 may be inserted in a pocket formed in the housing 1565 and may be formed of a more rigid material, such as steel, for example. Pivoting may be limited by stops or pockets engaging the magnet 1538 at the desired pivoting limits (not shown).

In this embodiment, which is adapted for use with an electronic circuit breaker, such as the electronic circuit breaker including two branches described herein, a first end 1543 may be provided on the armature 1542 to be engaged by an actuator 1550, such as an electromagnetic actuator. In the depicted embodiment, the armature 1542 may include a latching surface 1544 formed on a tab extending from a body of the armature 1542 at a second end 1543B. As described above, the latching surface 1544 engages a tripping surface 1530T on a cradle 1530 (only a portion shown in FIG. 15B), and when a temperature threshold due to a persistent over current condition is encountered, engagement portion 1542C is engaged and contacted by the moveable end 1539C of the bimetal member 1539. This pivots the armature 1542 about tabs 1542D (only one of two shown in FIG. 15D) and about the pivot location 1552 and trips the circuit breaker, as described above.

In the case of an arc fault, ground fault or other unwanted electrical condition being sensed, the actuator 1550 may actuate the armature 1542 by way of magnetic attraction to pole 1551, which pivots the armature 1542 about pivot location 1552 and thereby disengages latching surface 1544 from tripping surface 1530T. As in the previous embodiments, an electrical strap 1548 may be provided and coupled to a load terminal 1540 and the bimetal member 1539. A calibration screw 1562 may contact a cantilevered end 1548A of the electrical strap 1548 which extends beyond the bimetal member 1539 and may be adjusted to calibrate the tripping unit 1536. Additionally, a sensor 1546 may be provided to sense an electrical condition in the electrical strap 1548. The electrical strap 1548 may be encircled by the sensor 1546. Any suitable sensor may be used.

Figure 16:
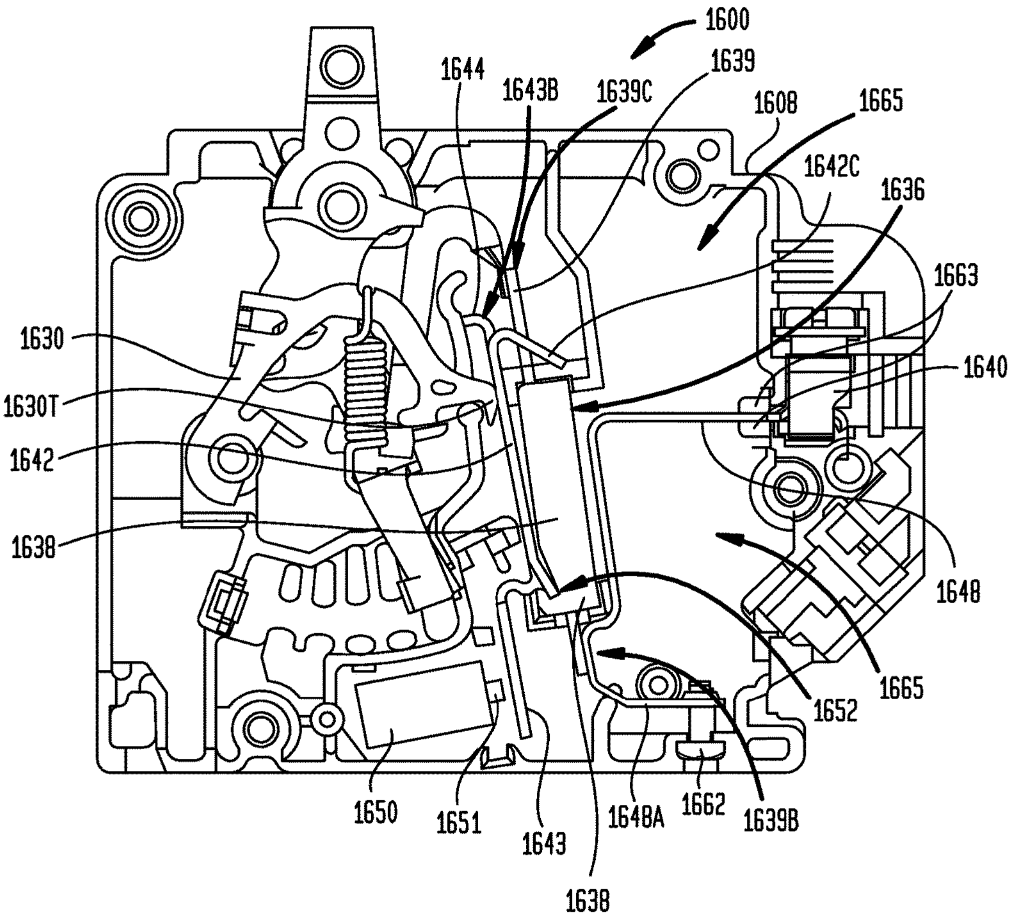
FIG. 16 is a side view of another circuit breaker including a tripping assembly according to embodiments of the invention.

FIG. 16 illustrates yet another embodiment of a tripping mechanism 1600 for a circuit breaker. In this instance, the depicted tripping mechanism 1600 is adapted for use in a duplex electronic circuit breaker. This embodiment is similar to the FIG. 3 embodiment, but differs in the configuration of the electrical strap 1648, the location of the calibration screw 1662, and the configuration of the arc chamber 1602. In this embodiment, in a like manner as in FIG. 3, the tripping mechanism 1600 includes a tripping unit 1636 having a magnet 1638, a bimetal member 1639 received alongside of the magnet 1638, and an armature 1642. The armature 1642 is pivotable on the magnet 1638, and the pivot is formed in the same way as described in FIG. 4A and FIGS. 15A-15D. As before, the armature 1642 may include an engagement portion 1642C at the second end 1643B, which is engageable with the bimetal member 1639 at a moveable end 1639C thereof.

In this embodiment, a first end 1643 may be provided on the armature 1642 to be engaged by an actuator 1650, such as an electromagnetic actuator. In the depicted embodiment, the armature 1542 may include a latching surface 1644 formed on a tab extending from a body of the armature 1642 at the second end 1643B. The latching surface 1644 engages a tripping surface 1630T on a cradle 1630 in an un-tripped condition. When a temperature threshold due to a persistent over current condition is encountered, engagement portion 1642C is engaged and contacted by the moveable end 1639C of the bimetal member 1639. This pivots the armature 1642 about the pivot location 1652 on the magnet 1638 and trips the circuit breaker. In the case of a short circuit condition, current flow through the bimetal element 1639 may induce a magnetic field in the magnet 1638 thereby causing the armature 1642 to be attracted to the sidewalls of the magnet 1638. This pivots the armature 1642 about the pivot location 1652 which, in turn, disengages the latching surface 1644 from the tripping surface 1630T on a cradle 1630.

In the case of an arc fault, ground fault or other unwanted electrical condition being sensed by an electronic processing circuit (not shown), the actuator 1650 may be commanded to actuate the armature 1642 by way of magnetic attraction to pole 1651. As described above, this pivots the armature 1642 about pivot location 1652 and disengages the latching surface 1544 from the tripping surface 1530T. As in the previous embodiments, an electrical strap 1648 may be provided and coupled to a load terminal 1640 and the first end 1639B of the bimetal member 1539.

As shown, the electrical strap 1648 may pass closely alongside of the magnet 1638 and then extend towards the load terminal 1640 where the electrical strap 1638 may be retained between one or more retaining portions 1663 of the housing portion 1608. A calibration screw 1662 may contact a cantilevered end 1648A of the electrical strap 1648 which extends beyond the bimetal member 1639. This cantilevered end 1648A may be adjusted to calibrate the tripping unit 1636. Additionally, a sensor 1546 may be provided to sense an electrical condition in the electrical strap 1548. The electrical strap 1548 may be encircled by the sensor 1546. Any suitable sensor may be used. This configuration of the tripping unit 1636 and electrical strap 1648 may allows large spaces 1665 to be made available for the electronic components, and may contribute to the low profile of the circuit breaker.

Figure 17A:
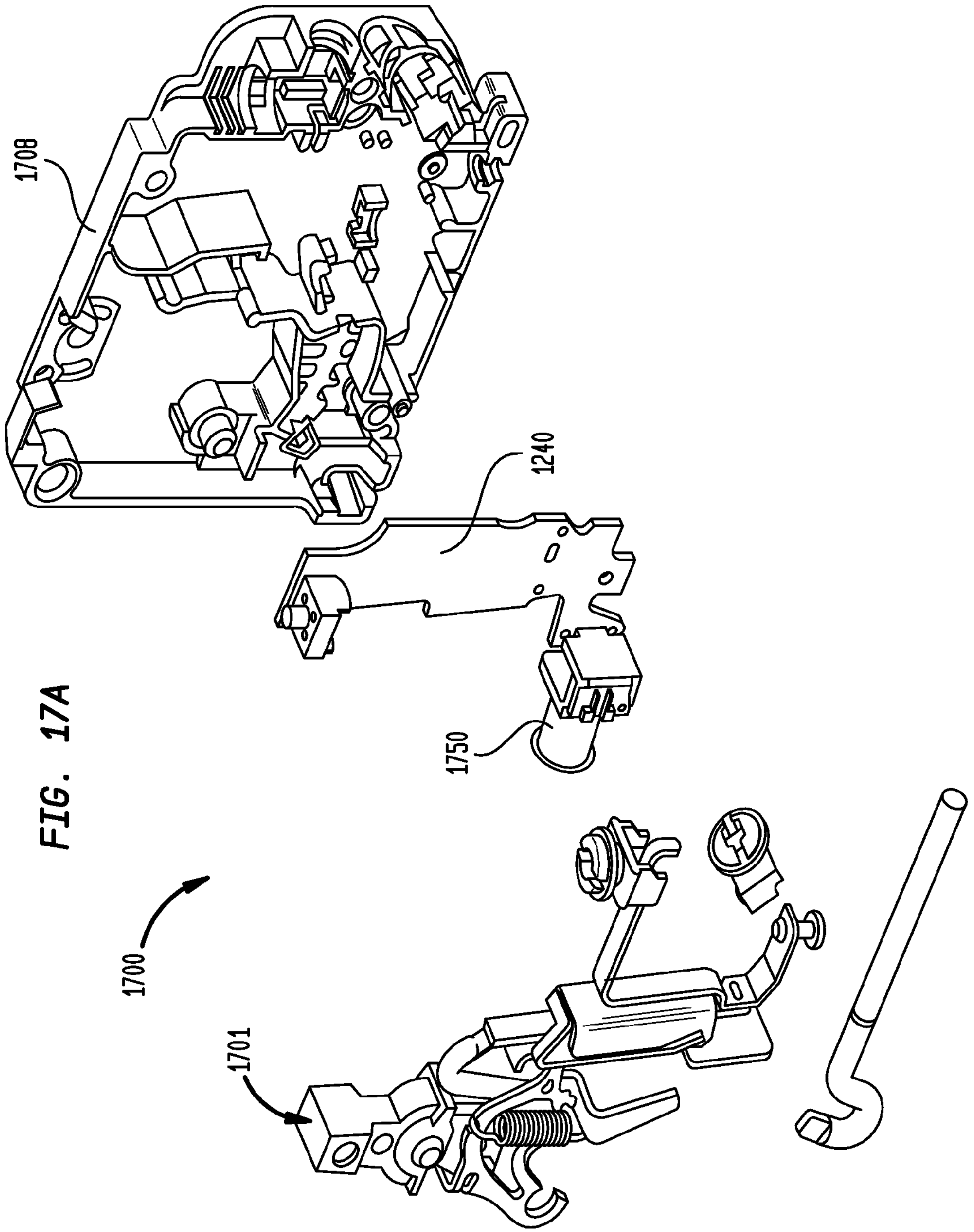
FIGS. 17A and 17B are collectively an exploded perspective view of another electronic circuit breaker according to embodiments of the invention.
Figure 17B:
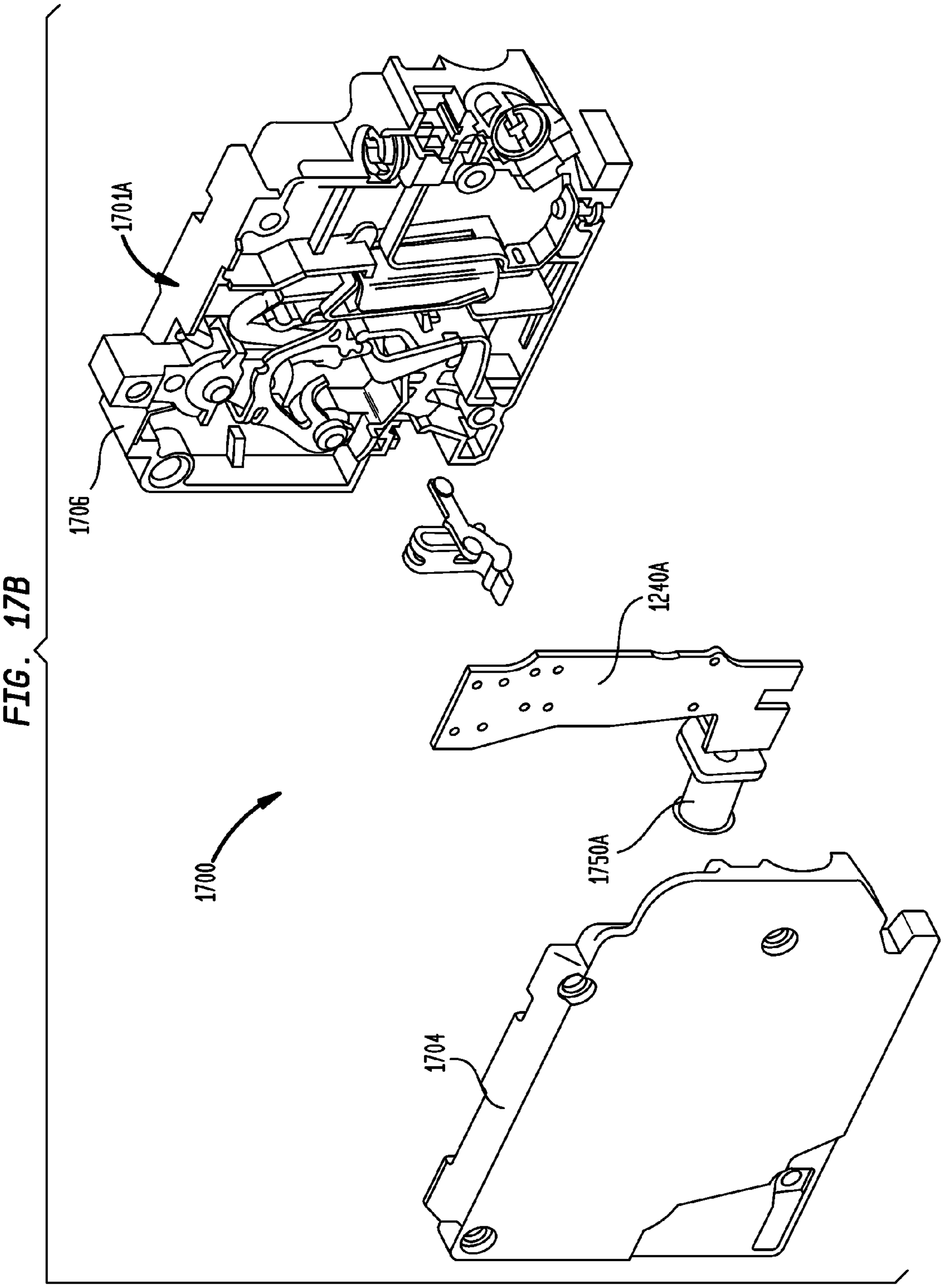

FIGS. 17A-17B illustrates various components of another exemplary electronic circuit breaker 1700 including two electrical branches according to embodiments of the invention. This embodiment is similar to the FIG. 6 embodiment, and includes tripping mechanisms 1701, 1701A for each branch of the type described in FIG. 16. The electronic circuit breaker 1700 also includes left, center, and right housing portions 1704, 1706 and 1708, respectively. The difference in this embodiment is that electronic processing circuit for each branch is provided on separate printed circuit boards 1240, 1240A. In this embodiment, an actuator 1750, 1750A for each branch is mounted on each printed circuit board 1740, 1740A. Thus, as should be apparent that upon assembly, each circuit board 1740, 1740A may be sandwiched between respective engaging housing portions 1704, 1706 and 1706, 1708. Accordingly, this construction also results in an overall low profile width wherein an overall transverse width (Wt) is about 1 inch (about 25.4 mm) such that the electronic circuit breaker 1700 including two electrical branches may be installed in a standard 1-inch panel mounting location in a panelboard. This design is also applicable to an electronic circuit breaker including an overall transverse width (Wt) of about ¾ inch (about 19 mm).

While the invention is susceptible to various modifications and alternative forms, specific embodiments and methods thereof have been shown by way of example in the drawings and are described in detail herein. It should be understood, however, that it is not intended to limit the invention to the particular apparatus, systems or methods disclosed, but, to the contrary, the intention is to cover all modifications, equivalents and alternatives falling within the spirit and scope of the invention.

What is claimed is:

1. A circuit breaker, comprising:

a housing containing a moveable electrical contact;

an electronic processing circuit in a form of a printed circuit board; and a tripping mechanism coupled to the moveable electrical contact, the tripping mechanism including a tripping unit including:

a magnet, a bimetal member extending alongside of the magnet, an armature pivotable on the magnet, the armature having an engagement portion that engages with the bimetal member at a moveable end of the bimetal member, wherein the armature comprises a first end, an arc chamber formed by a first housing portion and a center housing portion, the arc chamber defined by an end wall, and an actuator that couples to the armature at the first end, the actuator is located in a pocket formed adjacent to the end wall and the actuator is further located along a back side of the circuit breaker opposite from a handle side, and within a space formed by an interaction of the first housing portion and the center housing portion, wherein the electronic processing circuit is mounted in a pocket of the first housing portion or sandwiched between the first housing portion and the center housing portion.

2. The circuit breaker of claim 1, wherein the armature comprises a second end opposite the first end, and a pivot location pivotable on the magnet and located between the first end and the second end.

3. The circuit breaker of claim 2, comprising a latching surface on the second end of the armature, and a cradle that couples to the armature at the second end.

4. The circuit breaker of claim 2, comprising a latching surface on a terminal end of the armature farthest away from the pivot location on the magnet.

5. The circuit breaker of claim 1, comprising a coil provided on the magnet or armature and operable to attract the armature towards the magnet.

6. The circuit breaker of claim 5, wherein the coil comprises a plurality of windings formed about a pole extending from the magnet.

7. The circuit breaker of claim 1, comprising an electrical strap extending between a load terminal and the bimetal member, the electrical strap including a cantilevered end extending beyond the bimetal member, the cantilevered end being connected to a calibration screw.

* * * * *